(12) United States Patent
Noh et al.

(10) Patent No.: US 10,637,613 B2
(45) Date of Patent: Apr. 28, 2020

(54) METHOD AND APPARATUS FOR MANAGING HYBRID AUTOMATIC REPEAT REQUEST PROCESS IN MOBILE COMMUNICATION SYSTEM

(71) Applicant: Samsung Electronics Co., Ltd., Suwon-si, Gyeonggi-do (KR)

(72) Inventors: Hoondong Noh, Suwon-si (KR); Youngwoo Kwak, Suwon-si (KR); Jeongho Yeo, Hwaseong-si (KR); Jinyoung Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/656,991

(22) Filed: Jul. 21, 2017

(65) Prior Publication Data

US 2018/0034596 A1 Feb. 1, 2018

(30) Foreign Application Priority Data

Jul. 28, 2016 (KR) .......................... 10-2016-0096448

(51) Int. Cl.
*H04L 1/18* (2006.01)
*H04L 1/00* (2006.01)
(Continued)

(52) U.S. Cl.
CPC .......... *H04L 1/1812* (2013.01); *H04L 1/0025* (2013.01); *H04L 1/1845* (2013.01);
(Continued)

(58) Field of Classification Search
None
See application file for complete search history.

(56) References Cited

U.S. PATENT DOCUMENTS

2006/0195767 A1 8/2006 Ihm et al.
2008/0031253 A1* 2/2008 Kim ...................... H04L 1/0045
370/393
(Continued)

FOREIGN PATENT DOCUMENTS

EP 1679817 A1 7/2006
WO 2015/179134 A1 11/2015
WO 2017030429 A1 2/2017

OTHER PUBLICATIONS

International Search Report for International Application No. PCT/KR2017/007914, dated Oct. 18, 2017. (4 pages).
(Continued)

*Primary Examiner* — Ayaz R Sheikh
*Assistant Examiner* — Faiyazkhan Ghafoerkhan

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for managing a hybrid automatic repeat request (HARQ) process of a base station in a mobile communication system according to an embodiment of the present disclosure includes confirming whether a first data corresponding to a first service and a second data corresponding to a second service collide with each other. The method also includes determining whether to toggle a new data indicator (NDI) based on a modulation and coding scheme (MCS) index and the number of physical resource block (PRB) if it is determined that the first data and the
(Continued)

second data collide with each other and retransmitting the NDI and the first data according to the determination result.

16 Claims, 17 Drawing Sheets

(51) Int. Cl.
    *H04W 4/90* (2018.01)
    *H04W 4/70* (2018.01)
    *H04W 88/02* (2009.01)
    *H04W 88/08* (2009.01)

(52) U.S. Cl.
    CPC .......... *H04L 1/1896* (2013.01); *H04L 1/0003* (2013.01); *H04L 1/0009* (2013.01); *H04W 4/70* (2018.02); *H04W 4/90* (2018.02); *H04W 88/02* (2013.01); *H04W 88/08* (2013.01)

(56) References Cited

U.S. PATENT DOCUMENTS

| | | | |
|---|---|---|---|
| 2009/0252089 A1 | 10/2009 | Lim et al. | |
| 2010/0325502 A1 | 12/2010 | Lindskog et al. | |
| 2011/0035639 A1* | 2/2011 | Earnshaw | H04L 1/1812 714/748 |
| 2011/0305213 A1* | 12/2011 | Lohr | H04L 1/1887 370/329 |
| 2012/0300616 A1* | 11/2012 | Zeng | H04W 72/1289 370/216 |
| 2012/0314678 A1* | 12/2012 | Ko | H04W 72/0406 370/329 |
| 2012/0320863 A1* | 12/2012 | Lee | H04L 1/0003 370/329 |
| 2013/0010720 A1* | 1/2013 | Lohr | H04L 5/001 370/329 |
| 2013/0094447 A1* | 4/2013 | Gidlund | H04W 88/16 370/328 |
| 2013/0230017 A1* | 9/2013 | Papasakellariou | H04W 72/0406 370/330 |
| 2013/0343261 A1* | 12/2013 | Gonsa | H04B 7/2606 370/315 |
| 2014/0119261 A1* | 5/2014 | Wang | H04W 72/0446 370/312 |
| 2014/0161088 A1* | 6/2014 | Seo | H04W 72/1278 370/329 |
| 2014/0185578 A1* | 7/2014 | Park | H04L 5/0053 370/329 |
| 2015/0049694 A1* | 2/2015 | Choi | H04L 5/0032 370/329 |
| 2016/0100422 A1* | 4/2016 | Papasakellariou | H04L 1/1896 370/329 |
| 2016/0226649 A1* | 8/2016 | Papasakellariou | H04L 5/0057 |
| 2017/0141833 A1 | 5/2017 | Kim et al. | |
| 2017/0171842 A1* | 6/2017 | You | H04L 5/0048 |
| 2017/0207884 A1* | 7/2017 | Jiang | H04L 1/0061 |
| 2017/0230994 A1* | 8/2017 | You | H04W 72/042 |
| 2017/0257860 A1* | 9/2017 | Nam | H04L 27/2602 |
| 2017/0288817 A1* | 10/2017 | Cao | H04L 1/1887 |
| 2017/0310430 A1* | 10/2017 | Terry | H04L 1/1816 |
| 2017/0310431 A1* | 10/2017 | Iyer | H04L 1/1861 |
| 2017/0311342 A1* | 10/2017 | You | H04B 7/0695 |
| 2017/0331670 A1* | 11/2017 | Parkvall | H04L 41/0816 |
| 2017/0359807 A1* | 12/2017 | Hong | H04W 52/325 |
| 2017/0367120 A1* | 12/2017 | Murray | H04L 5/0023 |
| 2018/0007683 A1* | 1/2018 | You | H04L 1/0067 |
| 2018/0019843 A1* | 1/2018 | Papasakellariou | H04L 1/1861 |
| 2018/0049097 A1* | 2/2018 | Chen | H04L 1/0003 |
| 2018/0262311 A1* | 9/2018 | Wang | H04W 72/14 |
| 2018/0270816 A1* | 9/2018 | Li | H04W 72/048 |
| 2018/0278368 A1* | 9/2018 | Kim | H04L 1/1864 |
| 2018/0368110 A1* | 12/2018 | Ying | H04W 72/04 |

OTHER PUBLICATIONS

Keith Mallinson, "The path to 5G: as much evolution as revolution", #GPP, The Mobile Broadband Standard HSPA, May 10, 2016, <http://www3gpp.org/news-events/3gpp-news/1774-5g_wiseharbour>. (4 pages).

Nokia, Alcatel-Lucent Shanghai Bell, "Punctured Scheduling for Low Latency Transmissions", 3GPP TSG-RAN WG1 #85, May 23-27, 2016, 4 pages, R1-165381.

Huawei, HiSilicon, "Consideration on multiplexing of non-sTTI and sTTI in the same carrier", 3GPP TSG RAN WG1 Meeting #84bis, Apr. 11-15, 2016, 4 pages, R1-162590.

Supplementary European Search Report dated Jun. 7, 2019 in connection with European Patent Application No. 17 83 4710, 12 pages.

* cited by examiner

METHOD AND APPARATUS FOR MANAGING HYBRID AUTOMATIC REPEAT REQUEST PROCESS IN MOBILE COMMUNICATION SYSTEM

CROSS-REFERENCE TO RELATED APPLICATION AND CLAIM OF PRIORITY

This application is related to and claims priority to Korean Patent Application No. 10-2016-0096448 filed on Jul. 28, 2016, the contents of which are incorporated herein by reference.

TECHNICAL FIELD

Various embodiments of the present disclosure relate to a method and an apparatus for managing a hybrid automatic repeat request (HARQ) process for coexistence of data communication and emergency communication in a mobile communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

To address the above-discussed deficiencies, it is a primary object to provide a method and an apparatus for managing a HARQ process capable of satisfying requirements according to each service and efficiently using frequency-time resources by providing a method for coexistence of data transmission between heterogeneous services.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of a method for managing a hybrid automatic repeat request (HARQ) process of a base station in a mobile communication system including: confirming whether a first data corresponding to a first service and a second data corresponding to a second service collide with each other; determining whether to toggle a new data indicator (hereinafter, NDI) based on a modulation and coding scheme (hereinafter, MCS) index and the number of physical resource block (hereinafter, PRB) if it is determined that the first data and the second data collide with each other; and retransmitting the NDI and the first data according to the determination result.

The first service may be an enhanced mobile broadband (eMBB) service or a massive machine type communications (mMTC) service and the second service may be an ultra-reliable and low-latency communications service.

The retransmitting may include retransmitting the first data after toggling the NDI if the MCS index is greater than a first threshold and the number of PRBs is greater than a second threshold and retransmitting the first data without toggling the NDI if the MCS index is smaller than the first threshold and the number of PRBs is smaller than the second threshold.

The retransmitting may include: retransmitting the first data after toggling the NDI if the number of code blocks (hereinafter, CB) calculated using the MCS index and the number of PRBs is greater than a third threshold and retransmitting the first data without toggling the NDI if the number of CBs calculated using the MCS index and the number of PRBs is smaller than the third threshold.

The method may further include: transmitting the second data to the terminal if the first data and the second data collide with each other and receiving NACK for the first data from the terminal.

Various embodiments of the present disclosure are directed to the provision of a base station for managing an HARQ process in a mobile communication system including: a transceiver transmitting/receiving a signal; and a controller performing a control to confirm whether a first data corresponding to a first service and a second data corresponding to a second service collide with each other; determine whether to toggle NDI based on an MCS index and the number of PRBs if it is determined that the first data and the second data collide with each other; and retransmit the NDI and the first data according to the determination result.

Various embodiments of the present disclosure are directed to the provision of a method for managing an HARQ process of a terminal in a mobile communication system including: receiving a second data from a base station and detecting it if a first data corresponding to a first service and the second data corresponding to a second service collide with each other; and receiving the NDI and the first data according to the determination result if it is determined whether to toggle the NDI based on the MCS index and the number of PRBs by the base station.

Various embodiments of the present disclosure are directed to the provision of a terminal for managing an HARQ process of a terminal in a mobile communication including: a transceiver transmitting/receiving a signal; and a controller performing a control to receive a second data from a base station and detect it if a first data corresponding to a first service and the second data corresponding to a second service collide with each other and receive the NDI and the first data according to the determination result from the base station if it is determined whether to toggle the NDI based on the MCS index and the number of PRBs by the base station.

Various embodiments of the present disclosure are directed to the provision of a data transmitting method of a base station including: transmitting a first transport block including at least one code block of a first type data to a terminal; generating an indicator indicating whether to combine the code blocks included in the first transport block in the terminal; and transmitting the indicator to the terminal, in which the indicator may indicate whether the at least one code block included in the first transport block needs to be combined with a previously transmitted or retransmitted transport block in the terminal.

Various embodiments of the present disclosure are directed to the provision of a data receiving method of a base station including: receiving a first transport block including at least one code block of a first type data from a base station; receiving an indicator indicating whether to combine the code blocks included in the first transport block in the terminal from the base station; and performing the combining of the first transport block based on the indicator, in which the indicator may indicate whether the at least one code block included in the first transport block needs to be combined with a previously transmitted or retransmitted transport block in the terminal.

Various embodiments of the present disclosure are directed to the provision of a base station transmitting data including: a transceiver; and a processor performing a control to transmit a first transport block including at least one code block of a first type data to a terminal, generate an indicator indicating whether to combine the code blocks included in the first transport block in the terminal, and transmit the indicator to the terminal, in which the indicator may indicate whether the at least one code block included in the first transport block needs to be combined with a previously transmitted or retransmitted transport block in the terminal.

Various embodiments of the present disclosure are directed to the provision of a terminal receiving data including: a transceiver; and a processor performing a control to receive a first transport block including at least one code block of a first type data from a base station, receive an indicator indicating whether to combine the code blocks included in the first transport block in the terminal, and perform the combining of the first transport block based on the indicator, in which the indicator may indicate whether the at least one code block included in the first transport block needs to be combined with a previously transmitted or retransmitted transport block in the terminal.

According to the embodiment of the present disclosure, the method and apparatus for managing a HARQ process may provide the method for coexistence of data transmission between heterogeneous services to satisfy the requirements according to each service, thereby reducing the delay of the transmission time and efficiently using the frequency-time resources.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
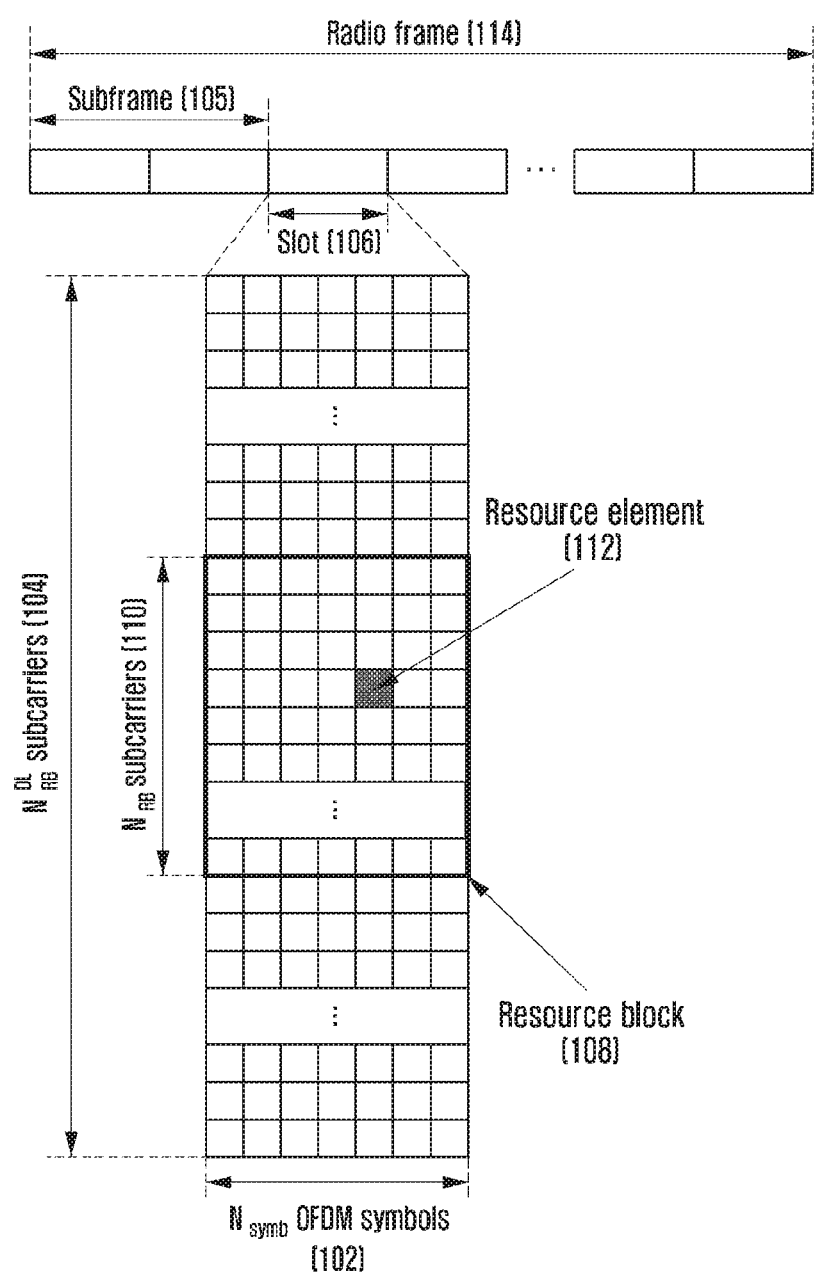
FIG. 1 illustrates a basic structure of a time-frequency domain which is a radio resource region in which a data channel or a control channel is transmitted in a downlink in a mobile communication system.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In describing the exemplary embodiments of the present disclosure in the present specification, a description of technical contents which are well known to the art to which the present disclosure belongs and are not directly connected with the present disclosure will be omitted. The reason why an unnecessary description is omitted is to make the gist of the present disclosure clear.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art may easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '~unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may further be separated into additional components and '~units'. In addition, the components and the '~units' may also be implemented to reproduce one or more CPUs within a device or a security multimedia card.

Hereinafter, embodiments of the present disclosure will be described in detail with reference to the accompanying drawings. If it is determined that a detailed description for the known functions or configurations related to the present disclosure may obscure the gist of the present disclosure, the detailed description therefor will be omitted. Further, the following terminologies are defined in consideration of the functions in the present disclosure and may be changed by intentions, practices or the like of users or operators. Therefore, the definitions thereof should be made based on the contents throughout the specification. Hereinafter, a base station is the subject performing resource allocation of a terminal and may be at least one of eNode B, Node B, a base station (BS), a wireless access unit, a base station controller, and a node on a network. The terminal may include user equipment (UE), a mobile station (MS), a cellular phone, a smart phone, a computer, or a multimedia system capable of performing a communication function. In the present disclosure, a downlink (DL) means a radio transmission path of a signal transmitted from a base station to a terminal and an uplink (UL) means a radio transmission path of a signal transmitted from the terminal to the base station. Further, as an example of LTE or an LTE-A system, an embodiment of the present disclosure is described below, but the embodiment of the present disclosure may be applied to other communication systems having similar technical background or a channel form. For example, 5G mobile communication technologies (5G, new radio, NR) developed after the LTE-A could be included. Further, the embodiment of the present disclosure may be applied even to other communication systems by partially being changed without greatly departing from the scope of the present disclosure under the decision of those skilled in the art.

A wireless communication system has been developed from a wireless communication system providing a voice centered service in the early stage toward broadband wireless communication systems providing high-speed, high-quality packet data services, like communication standards of high speed packet access (HSPA), long term evolution (LTE), or evolved universal terrestrial radio access (E-UTRA) of the 3GPP, high rate packet data (HRPD) and ultra mobile broadband (UMB) of 3GPP2, IEEE 802.16e or the like. In addition, the 5G or new radio (NR) communication standard is being produced as the 5G wireless communication system.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a user equipment (UE) or a mobile station (MS) transmits data or a control signal to a base station (eNodeB or base station (BS)) and the down link refers to a radio link through which a base station transmits data or a control signal to a terminal. The multiple access scheme as described above normally allocates and operates time-frequency resources for transmitting data or control information to each user to prevent the time-frequency resources from overlapping with each other, that is, establish orthogonality, thereby dividing the data or the control information of each user.

If a decoding failure occurs upon initial transmission, the LTE system has adopted a hybrid automatic repeat reQuest (HARQ) scheme of retransmitting the corresponding data in a physical layer. If a receiver does not accurately decode data, the HARQ scheme enables the receiver to transmit information (negative acknowledgement (NACK)) informing the decoding failure to a transmitter to thereby enable the transmitter to retransmit the corresponding data in the physical layer. The receiver combines the data retransmitted by the transmitter with the data that fails to previously decode, thereby increasing reception performance of the data. Further, when the receiver accurately decodes the data, information (acknowledgement (ACK)) informing a decoding success is transmitted to the transmitter so that the transmitter may transmit new data.

FIG. 1 illustrates a basic structure of a time-frequency domain, which is a radio resource region in which a data channel or a control channel is transmitted in a downlink in a mobile communication system.

In FIG. 1, an abscissa represents a time domain and an ordinate represents a frequency domain. A minimum transmission unit in the time domain is an OFDM symbol, in which Nsymb OFDM symbols 102 are collected to form one slot 106 and two slots are collected to one subframe 105. A length of the slot is 0.5 ms and a length of the subframe is 1.0 ms. Further, a radio frame 114 is a time domain section consisting of 10 subframes. A minimum transmission unit in a frequency domain is a sub-carrier, in which the entire system transmission bandwidth consists of a total of $N_{RB}^{DL}$ sub-carriers 104.

A basic unit of resources in the time-frequency domain is a resource element (RE) 112, and the RE 112 may be represented by an OFDM symbol index and a sub-carrier index. A resource block (RB) 10 (or physical resource block (PRB)) is defined by the $N_{symb}$ continued OFDM symbols 102 in the time domain and $N_{RB}$ continued sub-carriers 110 in the frequency domain. Therefore, one RB 108 consists of $N_{symb} \times N_{RB}$ REs 112.

Generally, a minimum transmission unit of data is the RB unit. In the LTE system, generally, $N_{symb}=7$ and $N_{RB}=12$ and $N_{RB}^{DL}$ is proportional to the system transmission bandwidth. A data rate is increased in proportion to the number of RBs allocated to the terminal. The LTE system is operated by defining six transmission bandwidths.

In an FDD system operated by dividing a downlink and an uplink based on a frequency, a downlink transmission bandwidth and an uplink transmission bandwidth may be different from each other. A channel bandwidth represents an RF bandwidth corresponding to the system transmission bandwidth.

The following Table 1 shows a correspondence relationship between the system transmission bandwidth and the channel bandwidth that are defined in the LTE system. For example, the LTE system having the channel bandwidth of 10 MHz is configured of a transmission bandwidth of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Downlink control information (DCI) is transmitted within first N OFDM symbols within the subframe. Generally, N={1, 2, 3}. Therefore, the N value varies in each subframe depending on the amount of control information to be transmitted at the current subframe. The control information may include a control channel transmission section indicator representing over how many OFDM symbols the control information is transmitted, scheduling information on downlink data or uplink data, HARQ ACK/NACK signals, or the like.

In the LTE system, the scheduling information on the downlink data or the uplink data is transmitted from a base station to a terminal through the downlink control information (DCI). The DCI is defined by various formats, and thus is applied and operated based on a DCI format defined depending on whether the DCI is the scheduling information (uplink (UL) grant) on the uplink data and the scheduling information (downlink (DL) grant) on the downlink data, whether the DCI is compact DCI having a small size of control information, whether the DCI is for spatial multiplexing using a multiple antenna, whether the DCI is for a power control, or the like.

For example, DCI format 1 that is the scheduling control information (DL grant) on the downlink data is configured to include at least following control information:

Resource allocation type 0/1 flag: It is informed whether a resource allocation scheme is type 0 or type 1. The type 0 applies a bitmap scheme to allocate a resource in a resource block group (RBG) unit. In the LTE system, a basic unit of the scheduling is an RB represented by time-frequency domain resources, and the RBG is configured of a plurality of RBs and thus becomes the basic unit of the scheduling in the type 0 scheme. The type 1 allocates a specific RB within the RBG.

Resource block assignment: The RB allocated for the data transmission is informed. The represented resource is determined depending on the system bandwidth and the resource allocation scheme.

Modulation and coding scheme (MCS): The modulation scheme used for the data transmission and a size of a transport block that is the data to be transmitted are informed.

HARQ process number: An HARQ process number is informed.

New data indicator: An HARQ initial transmission or retransmission is informed.

Redundancy version: An HARQ redundancy version is informed.

Transmit power control (TPC) command for physical uplink control channel (PUCCH): A transmit power control command for the PUCCH that is an uplink control channel is informed.

The DCI is subjected to a channel coding and modulation process and then is transmitted through a physical downlink control channel (PDCCH) (or control information, which is interchangeably used below) or an enhanced PDCCH (EPDCCH) (or enhanced control information, which is interchangeably used below). Generally, each DCI is independently scrambled with a specific radio network temporary identifier (RNTI) (or a terminal identifier) for each terminal to be added with a cyclic redundant check (CRC), subjected to channel coding, and then configured of independent PDCCH to be transmitted. In the time domain, the PDCCH is transmitted while being mapped during the control channel transmission section. A mapping location in the frequency domain of the PDCCH is determined by identifiers IDs of each terminal and is spread over the entire system transmission bandwidth.

The downlink data are transmitted through a physical downlink shared channel (PDSCH) that is a physical channel for downlink data transmission. The PDSCH is transmitted after the control channel transmission section and the DCI transmitted through the PDCCH informs the scheduling information on the detailed mapping location in the frequency domain, the modulation scheme, or the like.

By the MCS consisting of 5 bits among the control information configuring the DCI, the base station informs the modulation scheme applied to the PDSCH to be transmitted to the terminal and a data size (transport block size (TBS)) to be transmitted. The TBS corresponds to a size before channel coding for error correction is applied to data (transport block (TB)) to be transmitted by a base station.

The modulation scheme supported in the LTE system is quadrature phase shift keying (QPSK), 16 quadrature amplitude modulation (QAM), and 64QAM, in which each modulation order $Q_m$ corresponds to 2, 4, and 6. That is, in the case of the QPSK modulation, 2 bits per symbol may be transmitted, in the case of the 16 QAM modulation, 4 bits per symbol may be transmitted, and in the case of the 64QAM modulation, 6 bits per symbol may be transmitted.

Through the MCS having 5 bits among the control information configuring the DCI, the BS notifies the MS of the modulation scheme applied to the PDSCH to be transmitted and the transport block size (TBS) to be transmitted. The TBS corresponds to a size before channel coding for error correction is applied to data (transport block, TB) to be transmitted by the base station.

The modulation schemes supported by the LTE system are QPSK (Quadrature Phase Shift Keying), 16QAM (Quadrature Amplitude Modulation) and 64QAM, and the respective modulation orders ($Q_m$) correspond to 2, 4, and 6, respectively. That is, 2 bits per symbol for QPSK modulation, 4 bits per symbol for 16QAM modulation, and 6 bits per symbol for 64QAM modulation.

Figure 2:
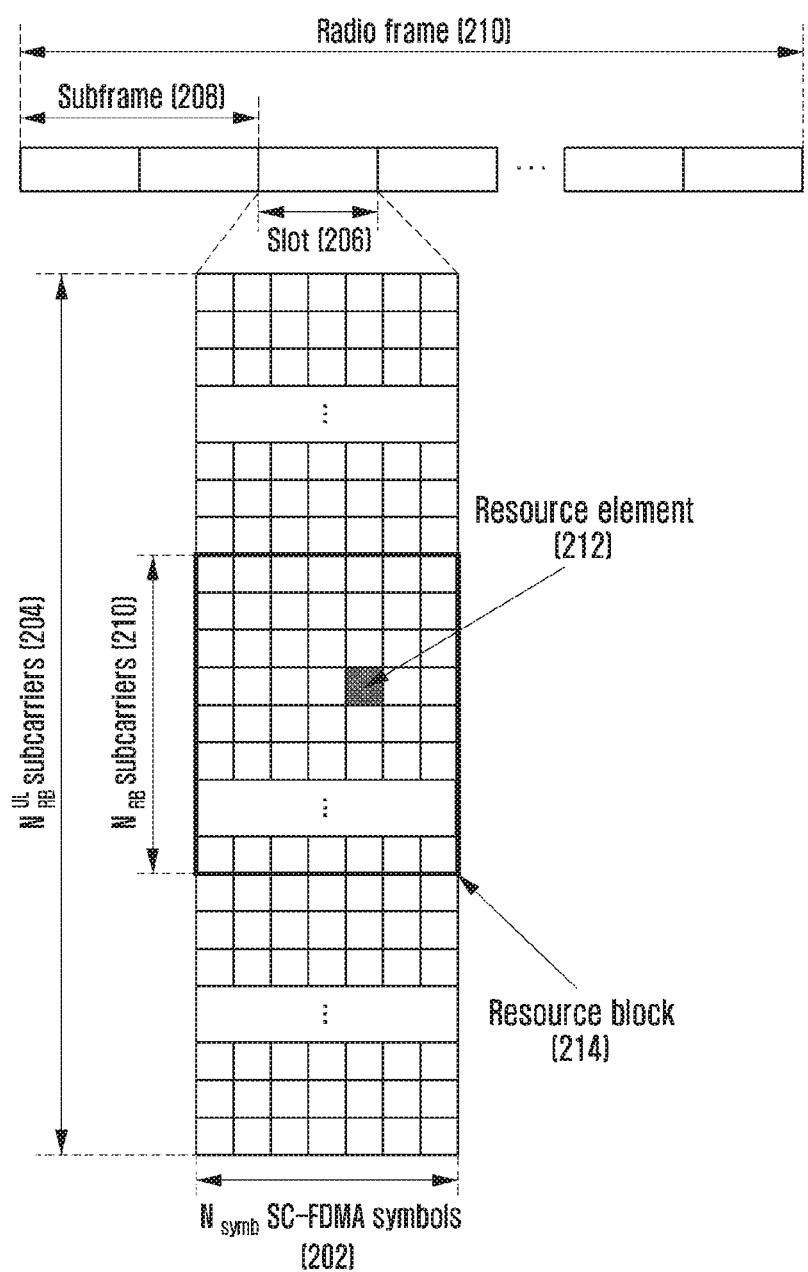
FIG. 2 illustrates a basic structure of a time-frequency domain which is a radio resource region in which a data channel or a control channel is transmitted in an uplink in a mobile communication system.

FIG. 2 illustrates a basic structure of a time-frequency domain which is a radio resource region in which a data channel or a control channel is transmitted in an uplink in a mobile communication system.

Referring to FIG. 2, an abscissa represents a time domain and an ordinate represents a frequency domain. The minimum transmission unit in the time domain is an SC-FDMA symbol 202, and the Nsymb SC-FDMA symbols are gathered to form one slot 206. Two slots are gathered to form one subframe 205. The minimum transmission unit in the frequency domain is a subcarrier, in which the entire system transmission bandwidth 204 consists of a total of $N_{RB}^{UL}$ subcarriers. The $N_{RB}^{UL}$ has a value in proportion to the system transmission bandwidth.

A basic unit of resources in the time-frequency domain is a resource element (RE) 212 and may be defined by an SC-FDMA symbol index and a subcarrier index. A resource block pair (RB pair) 208 is defined by $N_{symb}$ continued SC-FDMA symbols in the time domain and $N_{RB}$ continued subcarriers in the frequency domain. Thus, one RB consists of $N_{symb} \times N_{RB}$ REs. In general, the minimum transmission unit of data or control information is an RB unit. The PUCCH is mapped to a frequency region corresponding to 1 RB and transmitted for one subframe.

In the LTE system, a timing relationship of the PDSCH that is a physical channel for downlink data transmission or the PUCCH or the PUSCH that is an uplink physical channel to which HARQ ACK/NACK corresponding to the PDCCH/

EPDDCH including a semi-persistent scheduling release (SPS release) is transmitted is defined. For example, in an LTE system operated by frequency division duplex (FDD), the HARQ ACK/NACK corresponding to the PDSCH transmitted in an n-4-th subframe or the PDCCH/EPDCCH including the SPS release is transmitted to the PUCCH or the PUSCH in an n-th subframe.

In the LTE system, the downlink HARQ has adopted an asynchronous HARQ scheme in which data retransmission timing is not fixed. That is, if the HARQ NACK for initial transmission data transmitted by the base station is fed back from the terminal, the base station freely determines transmission timing of the retransmission data based on the scheduling operation. The terminal performs buffering on the data determined as an error as a result of decoding the received data for the HARQ operation and then performs combining with the retransmission data.

If the terminal receives the PDSCH including the downlink data transmitted from the base station in subframe n, the uplink control information including the HARQ ACK or NACK of the downlink data is transmitted to the base station through the PUCCH or the PUSCH in subframe n+k. At this time, the k is differently defined according to the FDD or time division duplex (TDD) of the LTE system and subframe setting thereof. For example, in the case of the FDD LTE system, the k is fixed as 4. On the other hand, in the case of the TDD LTE system, the k may be changed according to the subframe setting and a subframe number.

In the LTE system, unlike the downlink HARQ, the uplink HARQ has adopted a synchronous HARQ scheme in which the data transmission timing is fixed. That is, an uplink/downlink timing relationship of the PUSCH that is the physical channel for uplink data transmission, the PDCCH that is the downlink control channel preceding the PUSCH, and a physical hybrid indicator channel (PHICH) that is a physical channel to which the downlink HARQ ACK/NACK corresponding to the PUSCH is transmitted is fixed depending on the following rules.

If receiving the PDCCH including the uplink scheduling control information transmitted from the base station in the subframe n or the PHICH to which the downlink HARQ ACK/NACK are transmitted, the terminal transmits the uplink data corresponding to the control information in the subframe n+k through the PUSCH. At this time, the k is differently defined according to the FDD or the TDD of the LTE system and the subframe setting thereof. For example, in the case of the FDD LTE system, the k is fixed as 4. On the other hand, in the case of the TDD LTE system, the k may be changed according to the subframe setting and the subframe number.

Further, if receiving the PHICH transporting the downlink HARQ ACK/NACK from the base station in subframe i, the PHICH corresponds to the PUSCH that is transmitted by the terminal in subframe i-k. At this time, the k is differently defined according to the FDD or the TDD of the LTE system and the setting thereof. For example, in the case of the FDD LTE system, the k is fixed as 4. On the other hand, in the case of the TDD LTE system, the k may be changed according to the subframe setting and the subframe number.

The description of the wireless communication system is based on the LTE system, and the contents of the present disclosure are not limited to the LTE system but may be applied to various wireless communication systems such as NR and 5G.

In a wireless communication system, a service of a terminal may be classified into categories such as enhanced mobile broadband (eMBB), massive machine type communications (mMTC), and ultra-reliable and low-latency communications (URLLC). The eMBB may be considered as a service aiming at a high speed transmission of high-capacity data, the mMTC may be considered as a service aiming at terminal power minimization and multiple terminal access, and the URLLC may be considered as a service aiming at high reliability and low latency. The above three services may be a major scenario in an LTE system or in systems such as 5G/NR (new radio, next radio) since the LTE.

Figure 3:
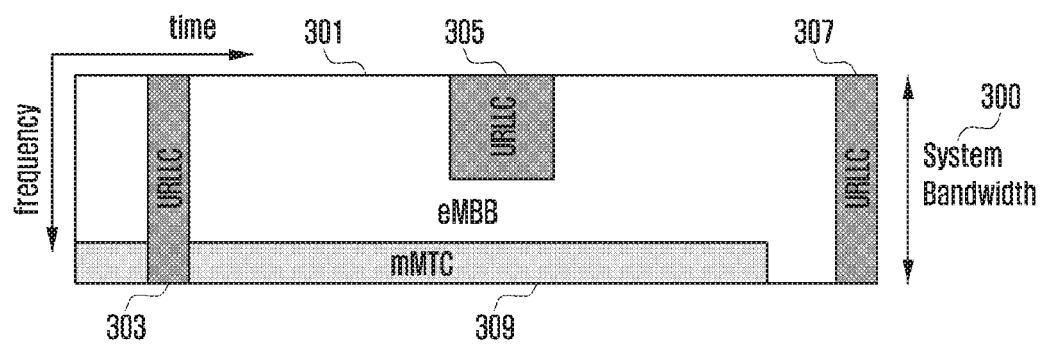
FIG. 3 illustrates an example of an appearance in which data for eMBB, URLLC, and mMTC, which are services to be considered in a mobile communication system, are allocated in frequency-time resources.

FIG. 3 illustrates an example of an appearance in which data for eMBB, URLLC, and mMTC, which are services to be considered in a mobile communication system, are allocated in frequency-time resources. The mobile communication system may mean the 5G or NR system.

FIG. 3 shows an appearance in which the data for the eMBB, the URLLC, and the mMTC are allocated in the entire system frequency bandwidth 300. If URLLC data 303, 305, and 307 are generated to be transmitted to the terminal while the eMBB 301 and the mMTC 309 are allocated and transmitted in a specific frequency band, a part to which the eMBB 301 and the mMTC 309 are allocated in advance is emptied and the URLLC data 303, 305, and 307 may be transmitted to the emptied part.

In the URLLC among the above services, since a short delay time is especially important, the URLLC data 303, 305, and 307 may be transmitted while being allocated to a part of the resource to which the eMBB 301 is allocated. According to the embodiment, a transmission time interval (TTI) length used for the URLLC transmission may be shorter than that used for the eMBB or the mMTC transmission.

If the URLLC is transmitted while being additionally allocated to the resource to which the eMBB 301 is allocated, the eMBB data may not be transmitted in the redundant frequency-time resources, such that the transmission performance of the eMBB data may be lowered. That is, in such a case, the eMBB data transmission failure may occur due to the URLLC allocation.

FIG. illustrates another example of an appearance in which data for eMBB, URLLC, and mMTC, which are services to be considered in a mobile communication system, are allocated in frequency-time resources. The mobile communication system may mean the 5G or NR system.

Figure 4:
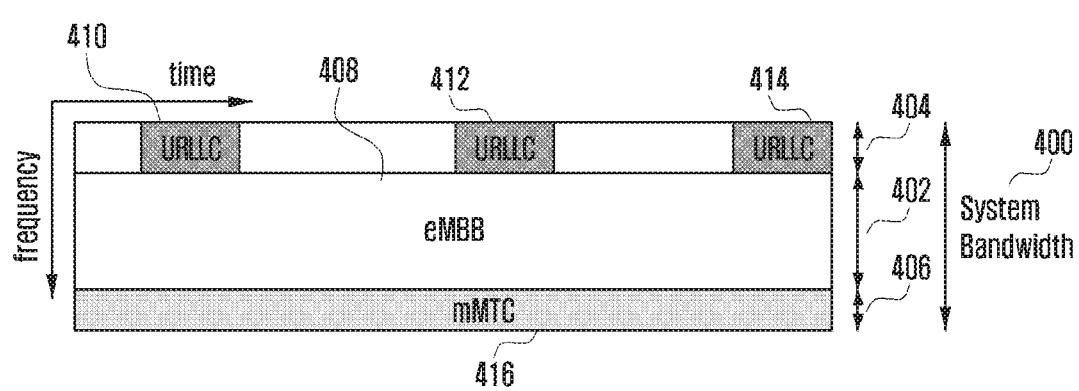
FIG. 4 illustrates another example of an appearance in which data for eMBB, URLLC, and mMTC, which are services to be considered in a mobile communication system, are allocated in frequency-time resources.

In FIG. 4, the entire system frequency band 400 may be segmented and thus each subband 402, 404, and 406 may be used to transmit services and data. The subbands may be segmented in advance and signaled to the terminal, or the base station may arbitrarily segment subbands and provide services to the terminal without information on the subbands. FIG. 4 shows an example in which the first subband 402 is used for the eMBB data transmission, the second subband 404 is used for the URLLC data transmission, and the third subband 406 is used for the mMTC data transmission. According to the embodiment, the transmission time interval (TTI) length used for the URLLC transmission may be shorter than that used for the eMBB or the mMTC transmission.

Figure 5:
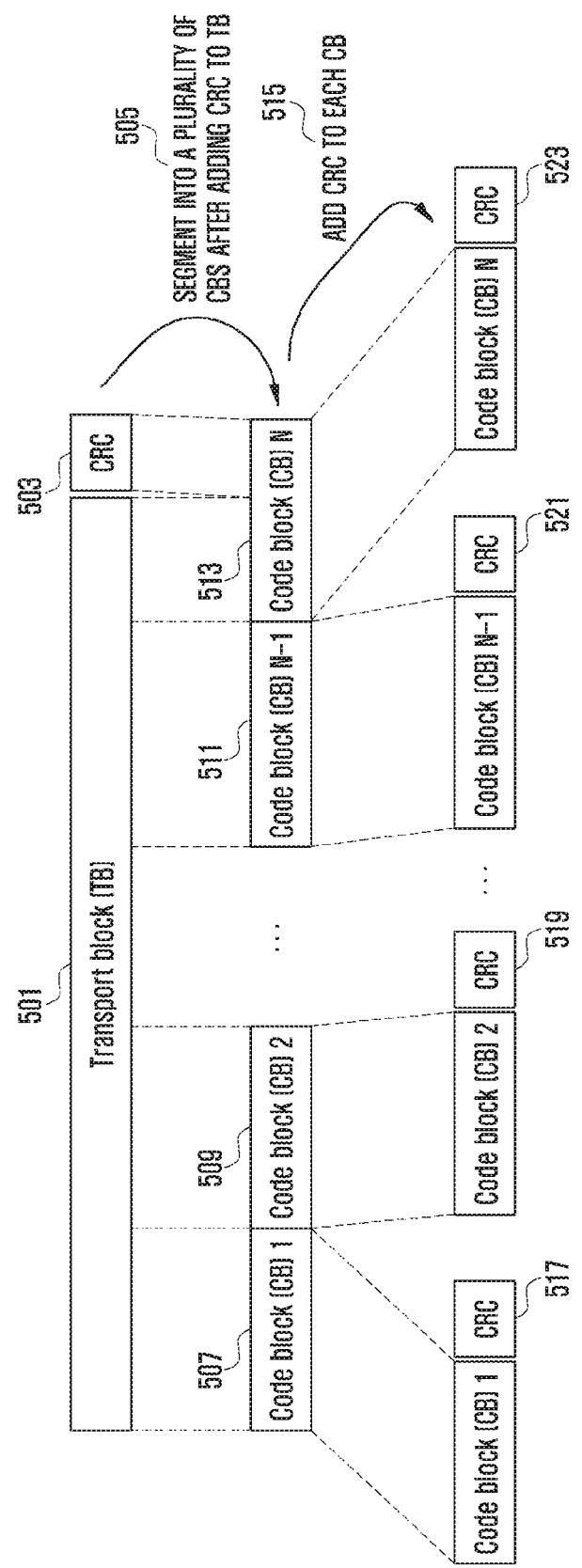
FIG. 5 illustrates an addition of CRC to a transport block and a code block in LTE/LTE-A.

FIG. 5 illustrates an addition of CRC to a transport block and a code block in LTE/LTE-A.

Hereinafter, the transport block may be interchangeably used with a TB, and the code block may be interchangeably used with a CB. In addition, the CRC addition means cyclic redundancy check (CRC) attachment.

In the LTE/LTE-A, a TB size (TBS) table as shown in Table 2 below is supported according to the number (NPRB) of transmitted spatial multiplexing layers. The following Table 2 may refer to a part of a TBS table available when a spatial multiplexing layer is 1 and the corresponding TBS table of 3GPP TS 36.213 available when a spatial multiplexing layer is equal to or more 2.

TABLE 2

Transport block size table (dimension 34 □ × 110) (some of lengths are omitted)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

In addition, referring to the following Table 3, the terminal may be informed of the ITBS through a modulation and coding system (hereinafter, MCS) index (IMCS) signaled by the DCI.

TABLE 3

Modulation and TBS index table for PDSCH

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |

TABLE 3-continued

Modulation and TBS index table for PDSCH

| MCS Index $I_{MCS}$ | Modulation Order $Q_m$ | TBS Index $I_{TBS}$ |
|---|---|---|
| 30 | 4 | |
| 31 | 6 | |

As described above, the base station determines the TBS according to the ITBS and the NPRB, generates the CRC for the transport block based on the determined TB and the following Equation 1, and adds the generated CRC after the TB as 503 of FIG. 5.

$$g_{CRC24A}(D)=[D^{24}+D^{23}+D^{18}+D^{17}+D^{14}+D^{11}+D^{10}+D^{7}+D^{6}+D^{5}+D^{4}+D^{3}+D+1] \quad \text{[Equation 1]}$$

Next, in step 505 of FIG. 5, a TB 501 and a TB CRC 503 are segmented into N code blocks 507, 509, 511, and 513 (codeblock segmentation). Here, N is determined by a TB size, a maximum code size (Z=6144), and a CRC length (L=24). Next, the CRC for the code block is generated based on the respective code blocks and the following Equation 2, and added after the CB as 517, 519, 521, and 523 of FIG. 5.

$$g_{CRC24B}(D)=[D^{24}+D^{23}+D^{6}+D^{5}+D+1] \quad \text{[Equation 2]}$$

Next, the base station maps the generated code block (CB) and CB CRC to an allocated virtual RB (VRB) along a frequency axis first and transmits it. As a simple example, if the number of REs on a frequency base of the allocated VRB is equal to the number of REs generated by one CB and CB CRC, resource mapping will be performed as in 604 of FIG. 6.

Figure 6:
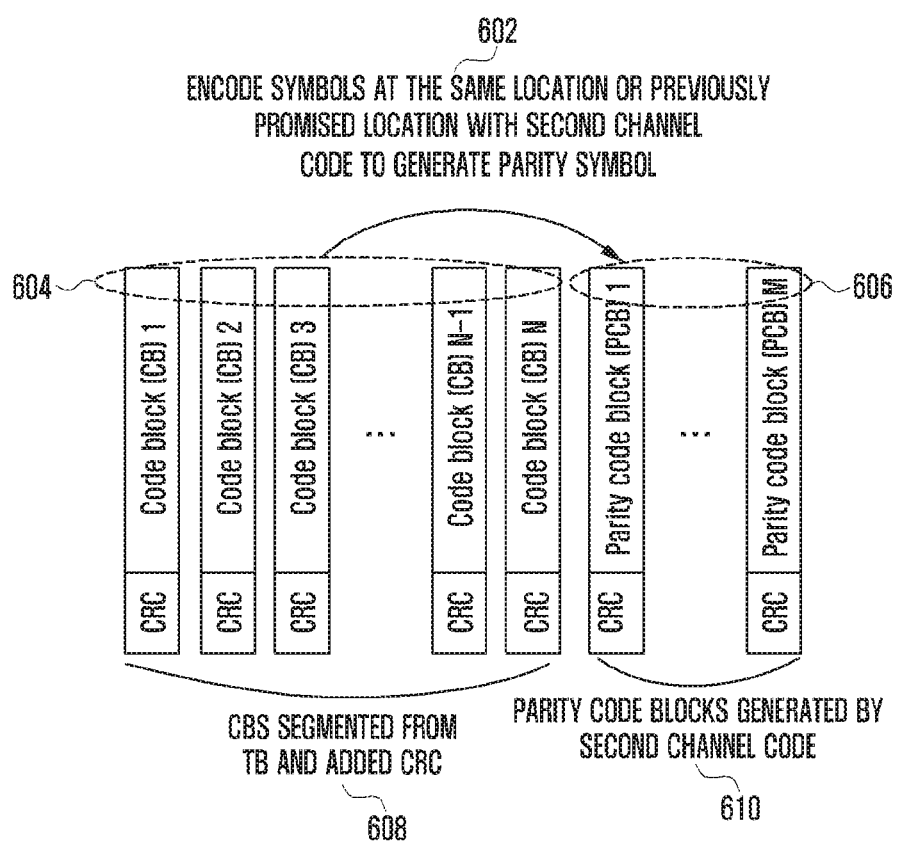
FIG. 6 illustrates a process of adding CRC to a code block and a parity code block.

FIG. 6 illustrates a process of adding CRC to a code block and a parity code block.

In FIG. 6, an abscissa indicates time and an ordinate indicates a frequency resource. FIG. 6 is a conceptual diagram, in which a location difference between the CB and the CRC is not for representing an actual RE where they are transmitted. Each CB and CRC may be transmitted over one to a plurality of OFDM symbols according to a size of the CB.

Referring to FIG. 6, reference numerals 606 and 610 represent additional channel codes (outer code, second channel code) for correcting errors in a CB unit separately from the existing channel codes (first channel codes) used for each CB. If the second channel code is applied, the base station may generate a parity symbol by encoding symbols of the same location or a previously promised location in a data area 604 with a second channel code (step 602). The generated parity symbols are mapped to a parity block 606 and transmitted to the terminal. The terminal may correct errors in a data area CB within a limit supported by the parity block.

In a wireless communication system, the service of the terminal may be classified into categories such as the enhanced mobile broadband (eMBB), the massive machine type communications (mMTC), and the ultra-reliable and low-latency communications (URLLC). The eMBB may be considered as a service aiming at a high speed transmission of high-capacity data, the mMTC may be considered as a service aiming at terminal power minimization and multiple terminal access, and the URLLC may be considered as a service aiming at high reliability and low latency. The above three services may be a major scenario in an LTE system or in systems such as 5G/NR (new radio, next radio) since the LTE.

When the base station schedules data corresponding to the eMBB service in a specific transmission time interval (TTI) to any terminal, if the situation where the URLLC data need to be transmitted in the TTI occurs, some of the eMBB data are not transmitted in a frequency bandwidth in which the eMBB data are already scheduled and transmitted and the URLLC data are transmitted in the frequency band. At this case, the terminal that receives the scheduled eMBB and the terminal that receives the scheduled URLLC may be the same terminal or may be different UEs.

In this case, since a part where some of the eMBB data that are scheduled and transmitted in advance are not transmitted occurs, the eMBB data is highly likely to be damaged. Therefore, in order to reduce the damage to the eMBB data, it is necessary to determine a method for receiving a terminal receiving a scheduled eMBB or a terminal receiving a scheduled URLLC. The eMBB service described below is referred to as a first type service, and the data for eMBB is referred to as first type data. The first type service or the first type data is not limited to the eMBB, but may be applied to even a case where a high speed data transmission is required or a broadband transmission is performed. Further, the URLLC service is referred to as a second type service, and the data for URLLC is referred to as second type data. The second type service or the second type data are not limited to the URLLC, but may correspond to even a case where a low latency is required or a high reliability transmission is required. Further, the mMTC service is referred to as a third type service and the data for mMTC is referred to as third type data. The third type service or the third type data are not limited to the mMTC but may correspond to a case where low speed, wide coverage, low power or the like are required.

To transmit the above three services or data, a structure of physical layer channels used for each type may be different. For example, the transmission time interval (TTI) length, the frequency resource allocation unit, the control channel structure, a data mapping method, and the like may be different.

In the present disclosure, the technical idea of the present disclosure will be described based on the above three services and three data, but the technical idea of the present disclosure is not limited thereto and may be applied to more kinds of services and the corresponding data.

For describing the method and the apparatus proposed in the present disclosure, the terms physical channel and signal in the existing LTE or LTE-A system can be used. However, the content of the present disclosure may be applied to wireless communication systems other than the LTE and LTE-A systems.

As described above, the present disclosure defines transmission and reception operations of a first type service, a second type service, and a third type service, or a transmitting and receiving operation of a terminal and a base station for data transmission, and proposes a detailed method for operating terminals receiving different types of services or data scheduling within the same system together. In the present disclosure, a first type terminal, a second type terminal, and a third type terminal each are terminals that receive the first type service, the second type service, and the third type services or the data scheduling.

Hereinafter, in the present disclosure, an uplink scheduling grant signal and a downlink data signal are referred to as a first signal. In addition, in the present disclosure, the uplink data signal for uplink scheduling grant and the HARQ ACK/NACK for the downlink data signal are referred to as a second signal.

In the present disclosure, if among the signals transmitted from the base station to the terminal, a signal expecting a response from terminal may be a first signal, and a response signal of the terminal corresponding to the first signal may be a second signal. In addition, in the present disclosure, the service type of the first signal may belong to the categories of the eMBB, the URLLC, the mMTC, and the like.

Hereinafter, in the present disclosure, a TTI length of the first signal means a time length taken to transmit the first signal. In addition, in the present disclosure, a TTI length of the second signal means a time length taken to transmit the second signal. In addition, in the present disclosure, second signal transmission timing is information on when the terminal transmits the second signal and when the base station receives the second signal, which may be referred to as second signal transmission/reception timing.

Hereinafter, in the present disclosure, if it is assumed that the base station transmits the first signal in an n-th TTI and the terminal transmits the second signal in an n+k-th TTI, informing the transmission timing of the second signal to the terminal by the base station is the same as informing a K value.

Alternatively, if it is assumed that the terminal transmits the second signal in an n+4+a-th TTI when the base station transmits the first signal in an n-th TTI, informing the transmission timing of the second signal to the terminal by the base station is the same as informing an offset value a. Instead of the n+4+a, offsets may be defined such as n+3+a and n+5+a. Hereinafter, similarly, like even an n+4+a value described in the present disclosure, the offset value a may be defined by various methods.

The content of the present disclosure may be applied to the FDD and TDD system.

Hereinafter, in the present disclosure, upper signaling is a method for transmitting a signal from a base station to a terminal using a downlink data channel of a physical layer or from a terminal to a base station using an uplink data channel of a physical layer.

Figure 7:
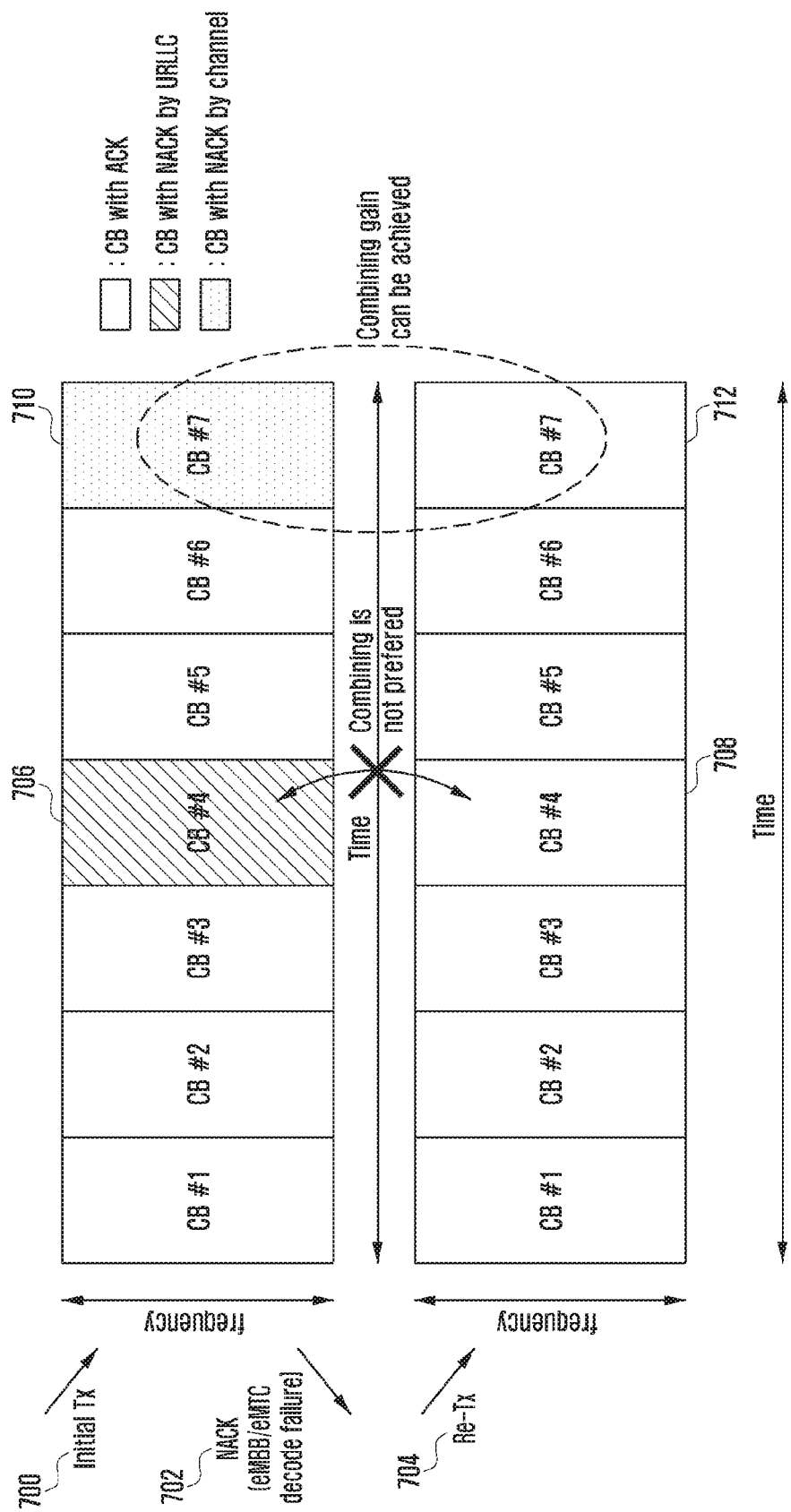
FIG. 7 illustrates a collision situation between different types of services.

FIG. 7 illustrates a collision situation between different types of services.

The second type service requires high reliability equal to or less than 10-6 BLER and low latency equal to or less than 1 ms. Accordingly, there may be a case where it may not be appreciated whether the second type service in the corresponding frequency time resource is transmitted at timing when a frequency time resource for the first type service or the third type service is set or scheduled.

For example, it is assumed that the TB of the first type service or the third type service is CB-mapped as 700 of FIG. 7 and initially transmitted. If the second type service needs to be transmitted in a time frequency resource denoted by 706 of FIG. 7, the base station transmits the second type service instead of transmitting CB #4. As a result, the terminal receiving the first type service or the third type service fails to decode the CB #4 and reports the second signal corresponding to NACK to the base station.

If receiving the second signal, the base station performs a retransmission 704 for the initial transmission 700 to perform HARQ. If the terminal receiving the first type service or the third type service receives retransmission 704, the terminal combines the CB #4 706 that does not pass through (fails to decode) a CRC check due to the second type service with the retransmitted CB #4 708 to again attempt the decoding.

At this time, unlike a case where a coding gain by combining a CB #7 710 that has not passed the CRC check due to a channel situation with a retransmitted CB #7 cannot be obtained, the 706 includes the data of the second type service not the data that the terminal targets, and therefore it is more advantageous to improve the reception performance by not performing the combining.

However, since the second signal for the current NACK is supported in TB units instead of CB units, the base station can not know whether the NACK that the terminal reports is generated due to a collision with the second type service or due to the channel situation. In addition, since the terminal may perform the CRC in CB units to know whether decoding of each CB succeeds but may not know whether the second type service is transmitted, it may not appreciate what decoding failure of any CB is.

Figure 8:
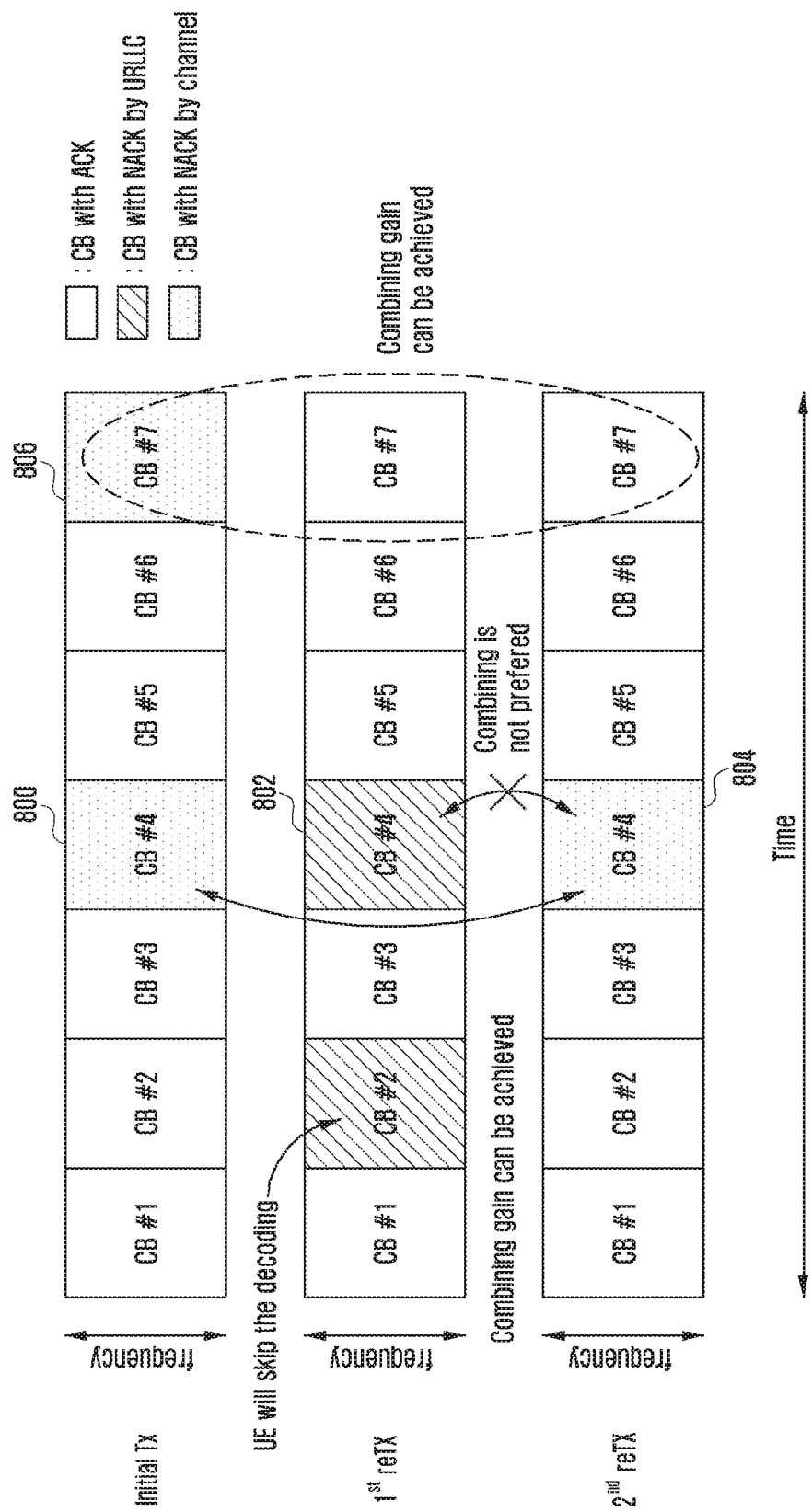
FIG. 8 illustrates a case where a NACK is generated due to a service related to emergency communication in a data retransmission of a base station according to an embodiment of the present disclosure.

FIG. 8 illustrates a case where a NACK is generated due to a service related to emergency communication in a data retransmission of a base station according to an embodiment of the present disclosure.

In FIG. 8, the case where to fail to perform decoding some of the CBs due to the channel situation upon the initial transmission is assumed. Hereinafter, there is a case where the base station performs a first retransmission for the HARQ, but the decoding failure occurs due to the second type service at the CB #4 and the base station performs a second retransmission. Under the situation as illustrated in FIG. 8, the terminal may appreciate whether the decoding for each CB succeeds, and therefore in the case of the CB #2, the decoding for the first retransmission will be skipped and in the case of the CB #7, the decoding will succeed by the combining. On the other hand, in the case of the CB #4, in order to obtain an optimal coding gain, the combining of the initial transmission in which the decoding failure due to the channel occurs with the second retransmission part is performed but the combining with a first retransmission part where the decoding failure occurs due to the collision with the second type service will not be performed. However, the operation is not supported for the reason described in FIG. 7.

To solve the above-described problem, the present disclosure can consider the following methods.

The first method is used to decode only the latest retransmission if the collision with the second type service occurs or is expected. It can be understood that the initial transmissions or one of the subsequent retransmissions is considered to collide with the second type service and all of them (data of the initial transmission and subsequent retransmissions) are discarded.

The second method is a method for excluding an initial transmission or retransmissions at which a collision with a second type service occurs or is expected from combining.

The third method is a method for excluding the corresponding CBs from an initial transmission or retransmissions in which a collision with a second type service occurs or is expected upon combining.

Hereinafter, the present disclosure will describe specific examples for performing one of the methods or a plurality of combinations of the methods. Hereinafter, in the present disclosure, the examples will be described based on a plurality of examples. However, the examples are not independent but at least one of the examples can be applied simultaneously or compositely.

<First Embodiment>

A first embodiment will be described with reference to FIGS. 9 and 10. In the first embodiment, the problems are solved by the HARQ management based on a new data indicator (NDI) toggle according to the conditions. As the first method for toggling, by the base station, the NDI of the TB to be retransmitted, if the terminal reports the NACK in the TB transmitted together with the second type service, the base station may retransmit the TB and toggle the corresponding NDI.

The terminal can not know whether or not the cause of the NACK is the second type service but the base station can know whether to transmit the at least second type service, such that the terminal may toggle the NDI according to the conditions to recognize the retransmitted TB as the initial transmission. These conditions will be described below in detail. That is, in this case, the terminal will not combine the retransmitted data with the data that fail to perform decoding due to the second type service.

If the TB of the second type service and the TB of the first type (or third type) service are transmitted together by the second method for toggling, by a base station, an NDI of a TB to be transmitted, the base station can automatically retransmit the corresponding TB and toggle the corresponding NDI according to the conditions without waiting for the ACK/NACK report of the terminal. In this case, overhead may increase but it is possible to perform the fast retransmission compared to the first method.

As described above, the resource allocations for each CB in the allocated VRB is determined according to the TBS table (function of MCS and NPRB).

Figure 9:
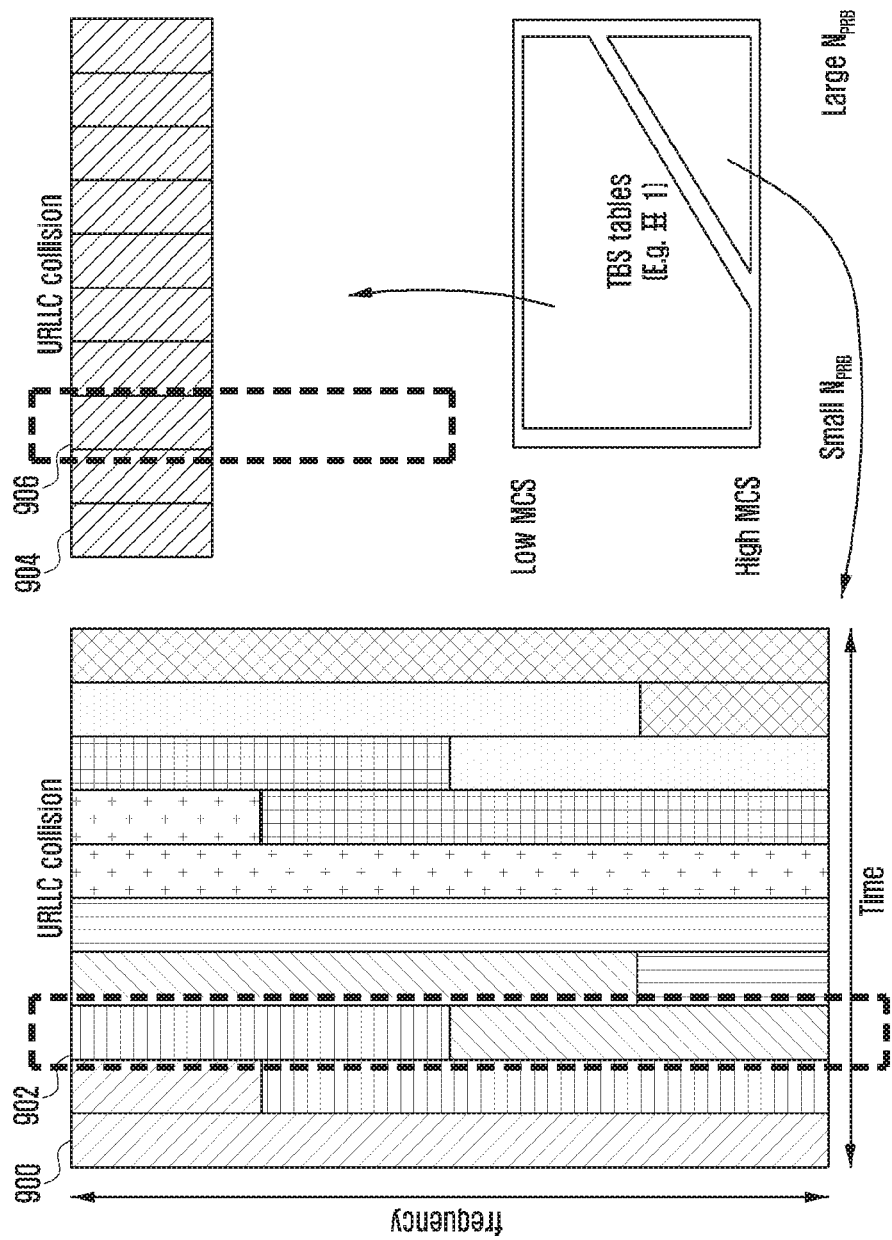
FIG. 9 illustrates an example of a code block mapping according to a modulation and coding scheme index and the number of physical resource blocks according to an embodiment of the present disclosure.

FIG. 9 illustrates an example of a code block mapping according to a modulation and coding scheme index and the number of physical resource blocks according to an embodiment of the present disclosure.

For example, when the high modulation and coding scheme (hereinafter, MCS) index is set or the number (NPRB) of large physical resource blocks (hereinafter, PRB) is set, a large number of CBs are generated as 900 of FIG. 9 and one CB is distributed in one or a small number of OFDM symbols.

Therefore, if the collision with the second type service occurs in the frequency time resource of 902, there is a high probability that many parts in one CB are lost. This means that there is a high probability that the decoding of the corresponding CB will fail, and if the corresponding CB decoding fails, the terminal will report the NACK for the entire TB.

On the other hand, if a low MCS index is set or a small NPRB is set, a small number of CBs are generated as 904 of FIG. 9, in which one CB is distributed in a plurality of OFDM symbols. Therefore, if the collision with the second type service occurs in the frequency time resource of 906, there is a high probability that only a part is lost in one CB. This means that the decoding success probability of the corresponding CB is high. Therefore, the base station may determine whether the NDI is toggled based on the set MCS index and NPRB.

Figure 10:
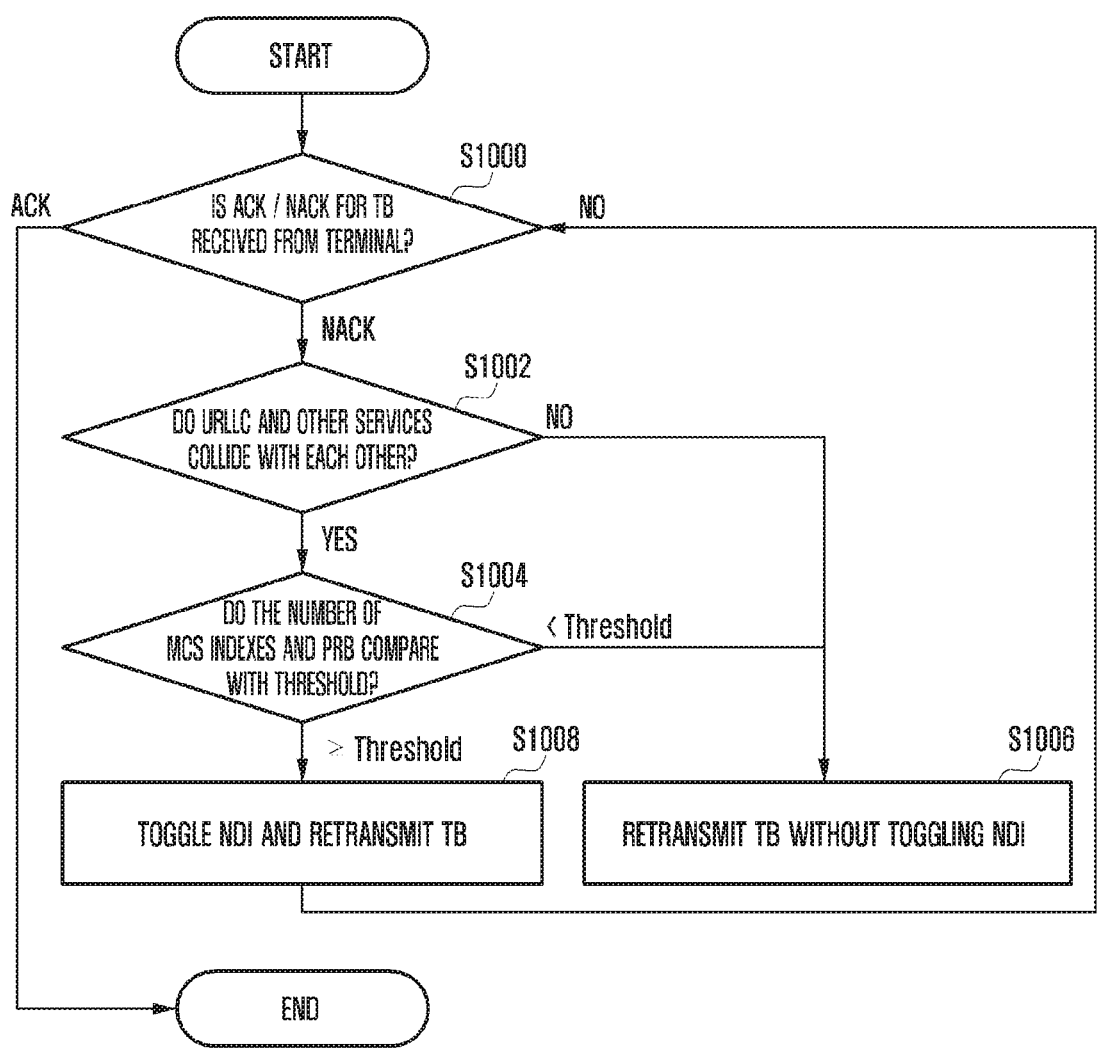
FIG. 10 illustrates a method for managing HARQ of a base station according to a first embodiment of the present disclosure.

FIG. 10 illustrates a method for managing HARQ of a base station according to a first embodiment of the present disclosure.

Referring to FIG. 10, the terminal receives the initial transmission or the retransmission from the base station, decodes the initial transmission or the retransmission, and reports ACK or NACK to the base station according to the decoding result (S1000). If the decoding fails, the base station is reported the NACK from the base station and determines whether the first type TB (or third type TB) indicated by the NACK and the second type transmission collide with each other (S1002).

However, as described above, if the base station automatically retransmits the corresponding TB according to a specific condition without waiting for the ACK/NACK report of the terminal and performs the retransmission by toggling the corresponding NDI, the base station may not wait for the ACK/NACK report of the terminal. In this case, the step S1000 may be omitted.

If the first type TB (or third type TB) and the second type transmission do not collide with each other, the base station retransmits the first type (or third type) TB without toggling the NDI, such that the terminal combines the corresponding TB with the retransmission (S1006).

If it is determined in step 1002 that the first type TB (or third type TB) and the second type transmission collide with each other, the base station determines whether the NDI is toggled based on the MCS index and the number of PRBs allocated to the corresponding first type or third type TB (S1004).

If the number of MCS indexes and PRBs allocated to the first type or third type TB is larger than a given threshold, one CB is distributed in a narrow time domain, such that the base station infers that the CB CRC fail occurs due to the collision with the second type service in the terminal to toggle the NDI and then retransmit the corresponding TB (S1008).

According to the embodiment, the base station may retransmit the first data after toggling the NDI if the MCS index is greater than a first threshold and the number of PRBs is greater than a second threshold and retransmit the first data without toggling the NDI if the MCS index is smaller than the first threshold and the number of PRBs is smaller than the second threshold.

According to another embodiment, the base station may retransmit the first data after toggling the NDI if the number of code blocks (CB) calculated using the MCS index and the number of PRBs is greater than a third threshold (e.g., 2) and retransmit the first data without toggling the NDI if the number of CBs calculated using the MCS index and the number of PRBs is a third threshold.

This is to allow the terminal not to combine the decoding failure part due to the collision with the second type service by considering the corresponding TB as the initial transmission. According to the above description, if the MCS and the PRB are smaller than the given threshold, one CB is distributed in a wide time domain, such that the base station will infer that the CB CRC check due to the collision with the second type service will succeed to retransmit the corresponding TB without toggling the NDI (S1006). This is to allow the terminal to combine the decoding failure part by considering the corresponding TB as the retransmission. Next, in step 1000, if the base station is reported ACK from the terminal, it is determined that the transmission of the corresponding TB succeeds, and the step ends.

Figure 11:
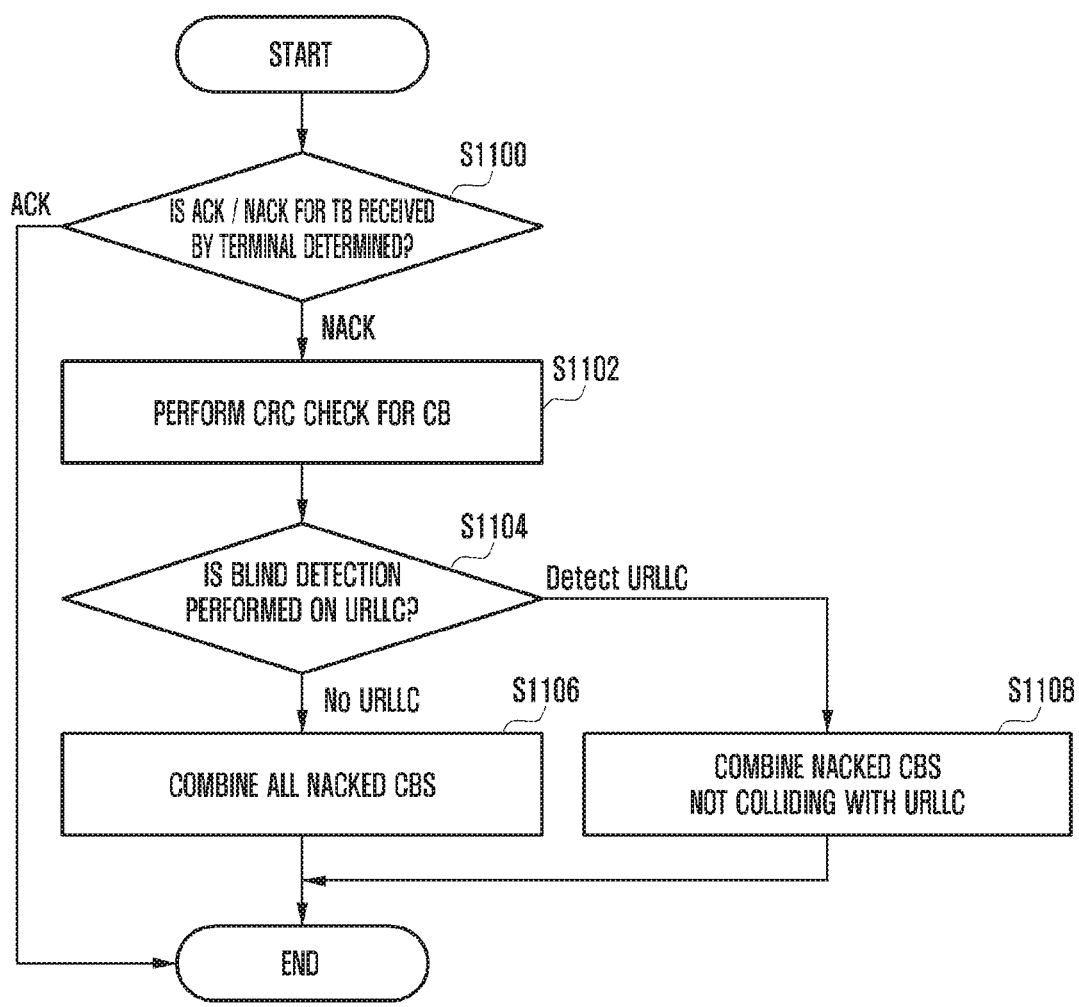
FIG. 11 illustrates a method for managing HARQ of a terminal according to a second embodiment of the present disclosure.

The second embodiment will be described with reference to FIG. 11. FIG. 11 illustrates a method for managing HARQ of a terminal according to a second embodiment of the present disclosure.

The second embodiment describes a method of managing HARQ by conditional combining based on terminal implementation. The terminal may perform a blind detection on the second type service transmission and determine whether to combine the initial transmission or the retransmissions received in advance with the retransmissions received after that according to the result.

If the first data corresponding to the first service related to the data communication and the second data corresponding to the second service related to the emergency communication are simultaneously scheduled by the terminal in any frequency bandwidth, the terminal may receive the second data from the base station. The terminal may perform the blind detection on the second data and may combine at least one code block that does not collide with the second data according to the blind detection result.

The first service may be enhanced mobile broadband (eMBB) or massive machine type communications (mMTC), and the second service may be ultra-reliable and low-latency communications (URLLC).

Referring to FIG. 11, the terminal may determine the ACK/NACK for the received TB and transmit the determined ACK/NACK to the base station (S1100). The terminal may perform the CRC check on the CB (S1102) and perform the blind detection on the URLLC (S1104). If no URLLC is detected according to the blind detection result, the terminal may combine all NACKed CBs (S1106). If the URLLC is detected according to the blind detection result, the terminal may combine all NACKed CBs that do not collide with the URLLC (S1108).

In order to determine whether the second type service is to be transmitted, the terminal may perform a second type service dedicated sequence or reference signal detection, a signal to noise ratio (SNR) comparison, a log-likelihood ratio comparison, or a correlation comparison between an area where the second type service transmission is suspected (frequency-time resource to which the CB in which the NACK is generated is transmitted) and other areas (frequency-time resource to which the CB passing through the CRC check is transmitted).

Next, if the second type service dedicated sequence or the reference signal is detected in the frequency-time resource to which the corresponding CB is transmitted or the difference between the comparison values is larger than a predetermine reference, it is considered that the terminal fail to perform decoding due to the collision of the corresponding CB with the second type service. Next, the terminal does not perform the combining with CB that is determined to have failed to perform the decoding due to the collision with the second type service, such that the corresponding TB may increase the decoding success probability and prevent unnecessary additional retransmission.

The base station may apply the same redundancy version to the corresponding TB transmission in the period in which the transmission probability of the second type service is high so that the terminal may easily make the comparison. If the base station applies the same redundancy version to an A-th transmission and a B-th transmission of the corresponding TB, N-th CBs CB#A_N and CB #B_B of the two transmissions include the same data, such that the performance deterioration due to the combining skip may be reduced and the comparison may be easily made.

Figure 12:
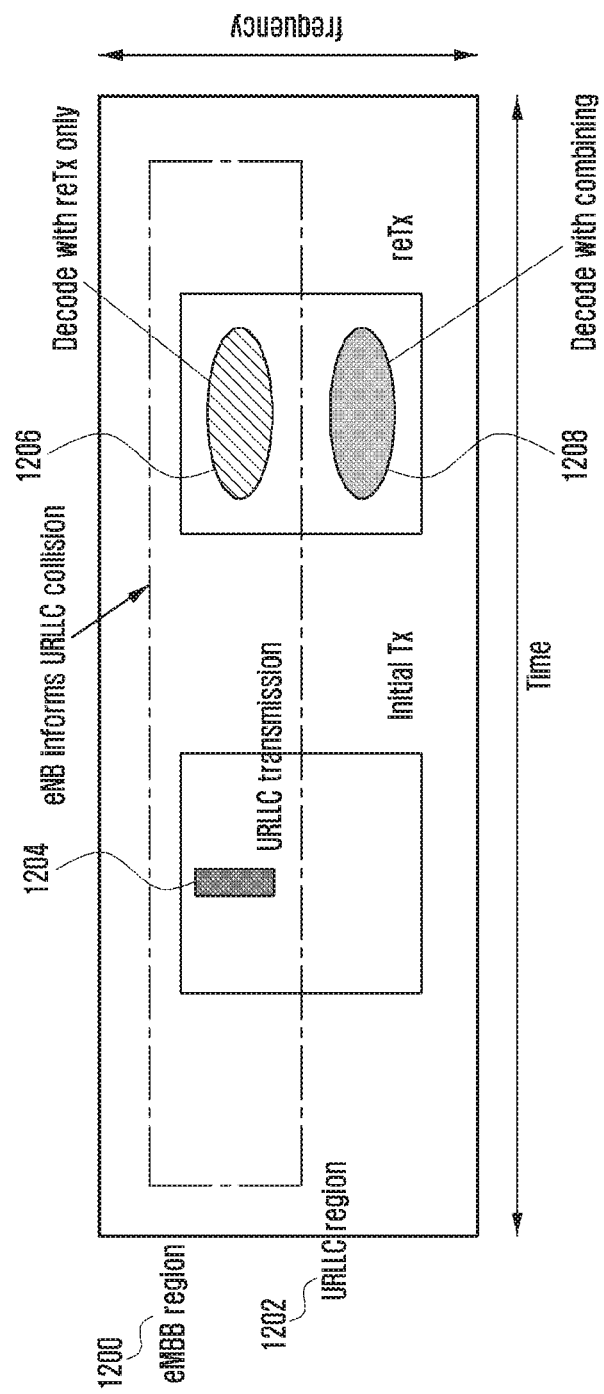
FIG. 12 illustrates a method for managing HARQ of a terminal according to a third embodiment of the present disclosure.

A third embodiment will be described with reference to FIGS. 12 and 13. FIG. 12 illustrates a method for managing HARQ of a terminal according to a third embodiment of the present disclosure.

The third embodiment solves the above problems by HARQ flushing/skipping in the second type service transmission area through a 1-bit indication. The present embodiment assumes the environment that a frequency time resource region to which the second type service may be transmitted may perform L1 signaling or higher layer (RRC) signaling to the terminals.

If the frequency time resource region for the first type or third type service transmission 1200 is greater than the URLLC region 1202, a collision 1204 with the second type service may occur in some frequency and time resources. In this case, the base station may provide 1-bit L1 signaling or 1-bit RRC signaling for whether the collision 1204 with the second type service occurs in control areas for 1206 and 1208 (or whether the second type service is transmitted) while performing a retransmission for the initial transmission or retransmission.

For example, if the 1-bit L1 signaling or the 1-bit RRC signaling is '1', it may mean that the second type service is transmitted in resources to which the TB connected to the corresponding signaling is transmitted. Conversely, if the 1-bit L1 signaling or the 1-bit RRC signaling is '0', it means that the second type service is not transmitted in the resource.

The terminal may determine whether to combine CBs 1206 of the URLLC region 1202 with CBs 1208 transmitted in the frequency time resources not belonging to the URLLC region 1202.

For example, if the terminal receives the 1-bit L1 signaling or the 1-bit RRC signaling from the base station and the previous transmission of the retransmitted 1206 overlaps with the second type service transmission, the terminal may not perform the combining on the CBs belonging to the 1206. In addition, it is possible for the terminal to perform the combining on the CBs belonging to the 1208. As another example, if the terminal receives the 1-bit L1 signaling or the 1-bit RRC signaling from the base station and the previous transmission of the retransmitted 1206 overlaps with the second type service transmission, it is possible to promise for the terminal not to perform the combining on all the CBs belonging to the 1206 and 1208.

Figure 13:
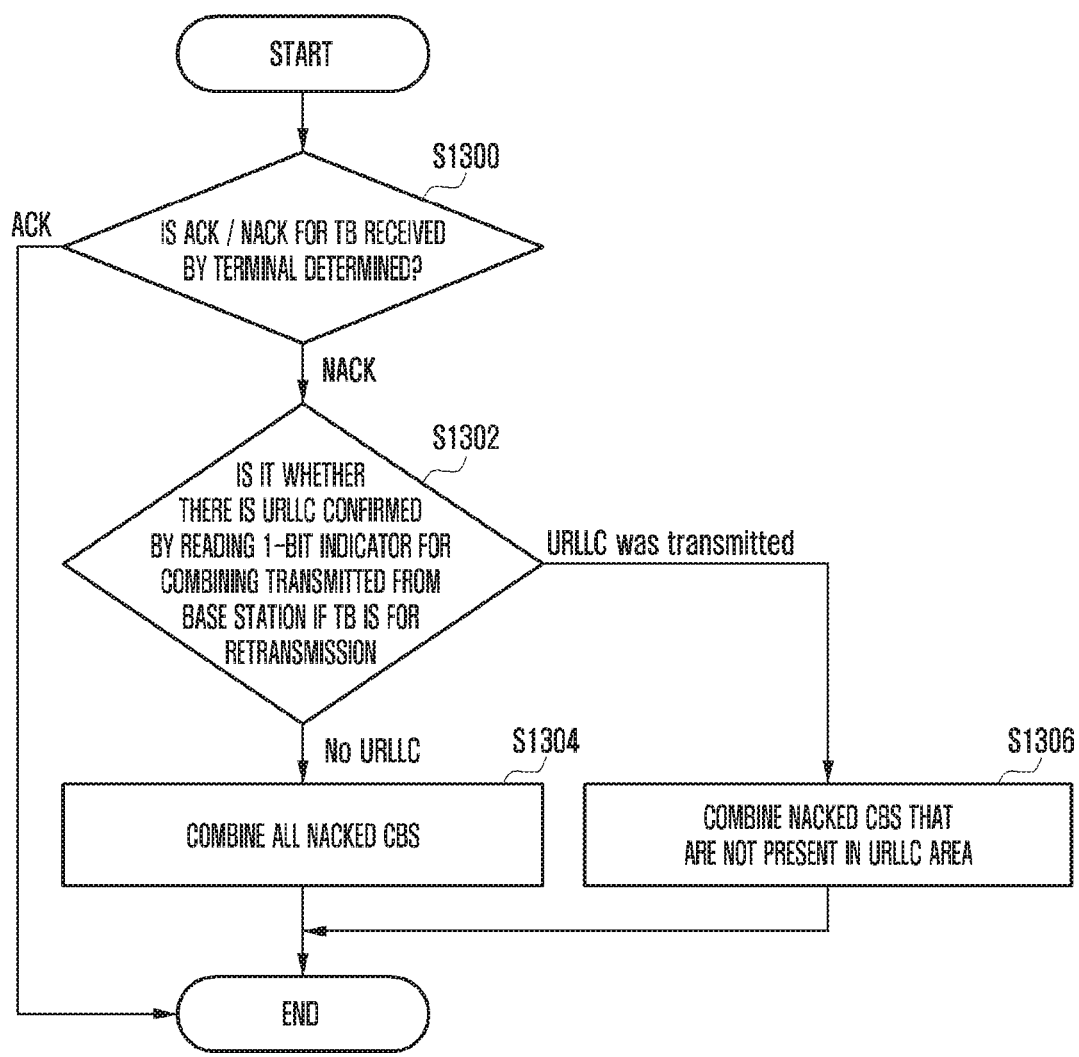
FIG. 13 illustrates a method for managing HARQ of a terminal according to a third embodiment of the present disclosure.

FIG. 13 illustrates a method for managing HARQ of a terminal according to a third embodiment of the present disclosure. Referring to FIG. 13, the terminal may determine the ACK/NACK for the TB received from the base station and transmit the determined ACK/NACK to the base station (S1300).

If the TB is for retransmission, the terminal may read the 1-bit indicator for the combining transmitted from the base station to check whether there is an URLLC (S1302). If it is checked that there is no URLLC according to the 1-bit indicator, the terminal may combine all NACKed CBs (S1304). If it is checked that the URLLC is transmitted according to the 1-bit indicator, the terminal may combine all NACKed CBs in the region not overlapping with the transmitted URLLC region (S1306).

Figure 14:
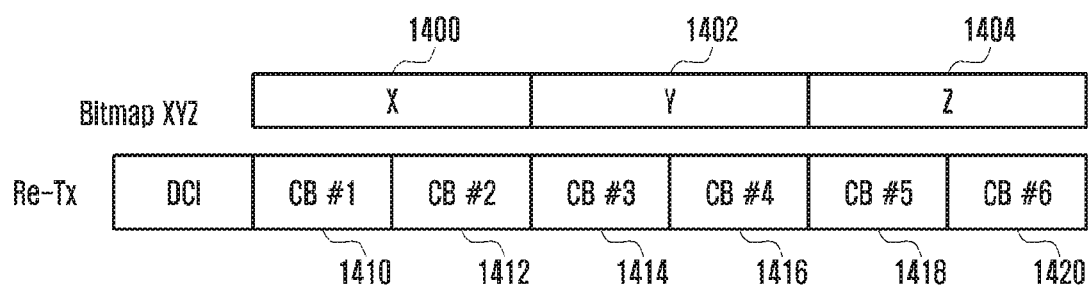
FIG. 14 illustrates a method for managing HARQ according to a fourth embodiment of the present disclosure.

A fourth embodiment will be described with reference to FIGS. 14 and 15. FIG. 14 illustrates a method for managing HARQ according to a fourth embodiment of the present disclosure.

In the fourth embodiment, the problems are solved by the HARQ flushing/skipping signaling for each CB or CB subgroup through multiple bits indication.

In the fourth embodiment, in addition to the setting information for the frequency time resource region in which the second type service may be transmitted, the base station informs the terminal whether the combining for each CB or CB subgroup through the L1 signaling consisting of a plurality of bits is made.

FIG. 14 is a diagram showing an example of a case where 3-bit L1 signaling is used. In this case, it is possible to promise to signal a first bit indicating whether to combine a first CB subgroup, a second bit indicating whether to combine a second CB subgroup, and a third bit indicating whether to combine a third CB subgroup. This may easily be changed to a case of using a different number of bitmaps. If the TB consists of the plurality of CBs at any transmission timing, each CB is mapped to one of the CB subgroups according to a predetermined rule.

For example, if the TB is segmented a total of N CBs at the corresponding transmission timing, each bit of the bit map consisting of the M bits are promised to allow each of the first (M-1) bits to indicate whether to combine ⌈N/M⌉ CBs and a last M-h bit to indicate whether to combine N-(M-1) ⌈N/M⌉ CBs. If as shown in FIG. 14, the TB is segmented into a total of 6 CBs at the corresponding transmission timing and a total of 3 L1 signaling is supported, a first bit 1400 informs whether first two CBs 1410 and 1412 are combined with previous transmissions, a second bit informs whether the next two CBs 1414 and 1416 are combined with the previous transmissions, and a third bit 1404 informs whether last two CBs 1418 and 1420 are combined with the previous transmissions.

In the third and fourth embodiments, 1-bit signaling or bitmap signaling for signaling for whether to collide with the second type service may have the same meaning as described above at the time of retransmission of any TB, but may have different meanings at the time of the initial transmission of the TB. This means that some of the existing L1 signaling can be reused for the signaling for whether the collision occurs. For example, if only one transport block is transmitted in the retransmission situation, the downlink control information (DCI) includes only the information (MCS, NDI, redundancy version, etc.) for the first transport block. At this time, a payload for the second transport block can be reused for the signaling for whether the collision occurs.

Figure 15:
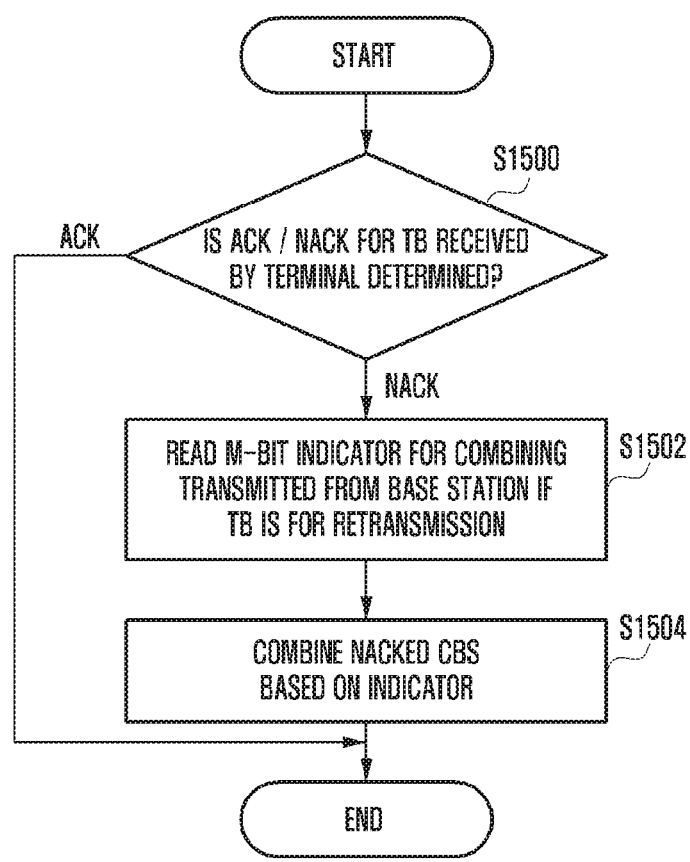
FIG. 15 illustrates a method for managing HARQ of a terminal according to a fourth embodiment of the present disclosure.

FIG. 15 illustrates a method for managing HARQ of a terminal according to a fourth embodiment of the present disclosure.

Referring to FIG. 15, the terminal may determine the ACK/NACK for the TB transmitted from the base station and transmit the determined ACK/NACK to the base station (S1500).

If the TB is for the retransmission, the terminal may read an M-bit indicator for combining transmitted from the base station (S1502). The terminal may combine NACKed CBs according to the M-bit indicator (S1504). Specifically, if the specific bit of the M-bit indicator indicates to perform the combining, the terminal may combine the CBs corresponding to the specific bit with the previously transmitted data.

Figure 16:
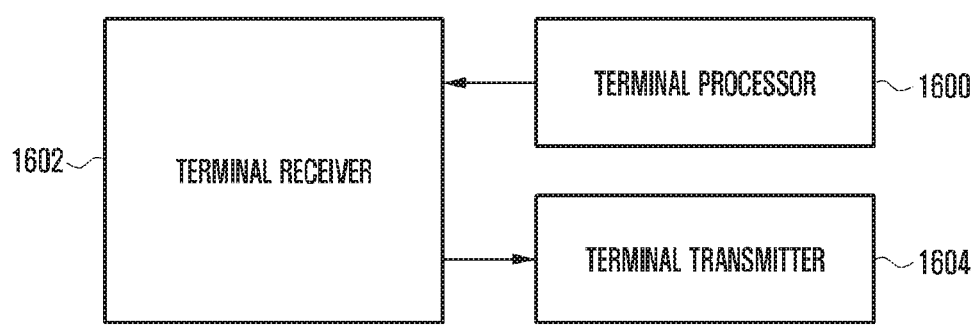
FIG. 16 illustrates an internal structure of a terminal according to an embodiment of the present disclosure.
Figure 17:
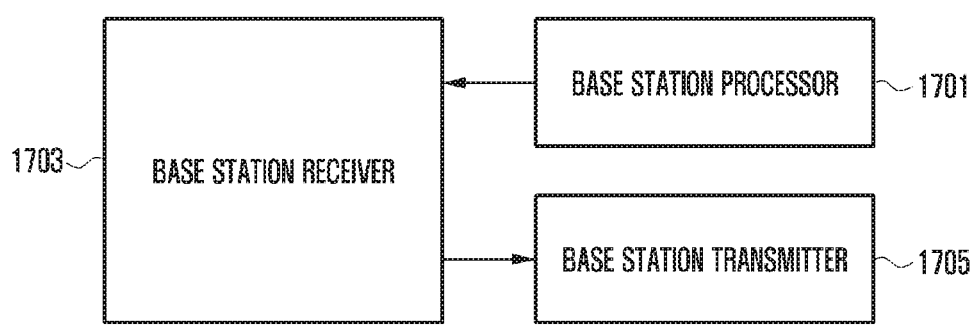
FIG. 17 illustrates an internal structure of a base station according to the embodiment of the present disclosure.

In order to perform the above-described embodiments of the present disclosure, a transmitter, a receiver, and a processor of the terminal and the base station are each shown in FIGS. 16 and 17. The first to fourth embodiments of the present disclosure describe that a transmitting/receiving method of a base station and a terminal performing an operation of transmitting/receiving determining whether other services and a second type service collide with each other and processing a second signal based on the collision. To perform the transmitting/receiving method, the transmitter, the receiver, and the processor of the base station and the terminal each need to be operated according to the embodiments.

FIG. 16 illustrates an internal structure of a terminal according to an embodiment of the present disclosure. As illustrated in FIG. 16, the terminal according to the embodiment of the present disclosure may include a terminal receiver 1600, a terminal transmitter 1604, and a terminal processor 1602.

The terminal receiver 1600 and the terminal transmitter 1604 are collectively referred to as a transceiver in the embodiment of the present disclosure. The transceiver may transmit/receive a signal to/from the base station. The signal may include control information and data. For this purpose, the transceiver may include an RF transmitter that up-converts and amplifies a frequency of the transmitted signal, an RF receiver that low-noise-amplifies the received signal and down-converts the frequency, or the like.

Further, the transceiver may receive a signal through a radio channel and output the received signal to the terminal processor 1602 and transmit the signal output from the terminal processor 1602 through the radio channel. The terminal processor 1602 may control a series process to operate the terminal 1500 according to the embodiment of the present disclosure as described above. For example, the terminal receiver 1600 may receive a signal including second signal transmission timing information from the base station, and the terminal processor 1602 may perform a control to interpret the second signal transmission timing. Then, the terminal transmitter 1604 may transmit the second signal at the above timing FIG. 17 illustrates an internal structure of a base station according to the embodiment of the present disclosure. As illustrated in FIG. 17, the base station of the present disclosure may include a base station receiver 1701, a base station transmitter 1705, and a base station processor 1703.

The base station receiver 1701 and the base station transmitter 1705 are collectively referred to as a transceiver in the embodiment of the present disclosure. The transceiver may transmit/receive a signal to/from the terminal. The signal may include control information and data. For this purpose, the transceiver may include an RF transmitter that up-converts and amplifies a frequency of the transmitted signal, an RF receiver that low-noise-amplifies the received signal and down-converts the frequency, or the like.

Further, the transceiver may receive a signal through a radio channel and output the received signal to the base station processor 1703 and transmit the signal output from the base station processor 1703 through the radio channel. The base station processor 1703 may control a series process to operate the base station according to the embodiment of the present disclosure as described above. For example, the base station processor 1703 may perform a control to determine a method for processing a second signal and generate the second signal information to be transmitted to the terminal. Then, the base station transmitter 1705 transmits the second signal information to the terminal, and the base station receiver 1701 performs the combining of the initial transmission and the retransmission according to the second signal.

Further, according to an embodiment of the present disclosure, the base station processor 1703 may perform a control to generate the downlink control information (DCI) including the second signal processing information.

Meanwhile, the embodiments of the present disclosure disclosed in the present specification and the accompanying drawings have been provided only as specific examples in order to assist in understanding the present disclosure and do not limit the scope of the present disclosure. That is, it is obvious to those skilled in the art to which the present disclosure pertains that other change examples based on the technical idea of the present disclosure may be made without departing from the scope of the present disclosure. Further, each embodiment may be combined and operated as needed. For example, some of the embodiments 1 and 2 of the present disclosure or some of the embodiments 3 and 4 may be combined with each other to operate the base station and the terminal. In addition, although the above embodiments are presented on the basis of the FDD LTE system, other modifications based on the technical idea of the embodiment may be applicable to other systems such as a TDD LTE system and a 5G or NR system.

As described above, in the present disclosure, the uplink scheduling grant signal and the downlink data signal are referred to as a first signal, an the uplink data signal for the uplink scheduling grant and the HARQ ACK/NACK for the downlink data signal are referred to as a second signal. However, the types of the first signal and the second signal have been provided only as specific examples in order to easily describe the technical content of the present disclosure and help understanding the present disclosure and do not limit the scope of the present disclosure. That is, it is obvious to those skilled in the art to which the present disclosure pertains that even other first signals and second signals based on the technical idea of the present disclosure can be practiced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a base station in a communication system, the method comprising:
   transmitting, to a terminal, a first data including a plurality of code blocks, the plurality of code blocks being included in one or more code block groups;
   receiving, from the terminal, a negative acknowledgement (NACK) corresponding to the first data;
   generating an indicator associated with a hybrid automatic repeat request (HARQ) combining at the terminal;
   transmitting, to the terminal, downlink control information (DCI) associated with a second data which is a retransmission of the first data, the DCI including the indicator; and
   transmitting, to the terminal, the second data, wherein the indicator indicates whether at least one code block group in the second data is combinable with at least one same code block group in the first data or not, and wherein at least one code block group of the first data is flushed and the second data is decoded in a case that the indicator indicates an HARQ flushing.

2. The method of claim 1, wherein in case that the indicator is M bits and a number of the plurality of code blocks is N, each M-1 bits of the indicator indicates whether ⌈N/M⌉ code blocks are combined and a last M-th bit indicates whether N-(M-1) ⌈N/M⌉ code blocks are combined.

3. The method of claim 1, wherein the generating of the indicator comprises determining that the at least one code block group mapped to resources in which transmissions of a first type data and a second type data overlapped with each other are not combinable in the terminal.

4. The method of claim 3, wherein the first type data is data for an enhanced mobile broadband (eMBB) service or a massive machine type communications (mMTC) service and the second type data is data for an ultra-reliable and low-latency communications (URLLC) service.

5. A method of a terminal in a communication system, the method comprising:

receiving, from a base station, a first data including a plurality of code blocks, the plurality of code blocks being included in one or more code block groups;

transmitting, to the base station, a negative acknowledgement (NACK) corresponding to the first data;

receiving, from the base station, downlink control information (DCI) associated with a second data which is a retransmission of the first data, the DCI including an indicator associated with a hybrid automatic repeat request (HARQ) combining at the terminal;

receiving, from the base station, the second data based on the DCI;

performing the HARQ combining of at least one code block group in the second data with at least one same code block group of the first data, in case that the indicator indicates an HARQ combining; and performing a flushing of at least one code block group of the first data and decoding the second data in a case that the indicator indicates an HARQ flushing.

6. The method of claim 5, wherein in case that the indicator is M bits and a number of the plurality of code blocks is N, each M-1 bits of the indicator indicates whether ⌈N/M⌉ code blocks are combined and a last M-th bit indicates whether N-(M-1) ⌈N/M⌉ code blocks are combined.

7. The method of claim 5, wherein the at least one code block group determined not to be combined at the terminal includes code blocks mapped to resources in which receptions of a first type data and a second type data overlapped with each other.

8. The method of claim 7, wherein the first type data is data for an enhanced mobile broadband (eMBB) service or a massive machine type communications (mMTC) service and the second type data is data for an ultra-reliable and low-latency communications (URLLC) service.

9. A base station in a communication system, the base station comprising:

a transceiver to transmit and receive signals; and
a processor coupled with the transceiver and configured to:

transmit, to a terminal, a first data including a plurality of code blocks, the plurality of code blocks being included in one or more code block groups, receive, from the terminal, a negative acknowledgement (NACK) corresponding to the first data, generate an indicator associated with a hybrid automatic repeat request (HARQ) combining at the terminal, transmit, to the terminal, downlink control information (DCI) associated with a second data which is a retransmission of the first data, the DCI including the indicator, and transmit, to the terminal, the second data, wherein the indicator indicates whether at least one code block group in the second data is combinable with at least one same code block group in the first data or not, and wherein at least one code block group of the first data is flushed and the second data is decoded in a case that the indicator indicates an HARQ flushing.

10. The base station of claim 9, wherein in case that the indicator is M bits and a number of the plurality of code blocks is N, each M-1 bits of the indicator indicates whether ⌈N/M⌉ code blocks are combined and a last M-th bit indicates whether N-(M-1) ⌈N/M⌉ code blocks are combined.

11. The base station of claim 9, wherein the processor configured to determine at least one code block group mapped to resources in which transmissions of a first type data and a second type data overlapped with each other are not combinable in the terminal.

12. The base station of claim 9, wherein the first type data is data for an enhanced mobile broadband (eMBB) service or a massive machine type communications (mMTC) service and the second type data is data for an ultra-reliable and low-latency communications (URLLC) service.

13. A terminal in a communication system, the terminal comprising:

a transceiver to transmit and receive signals; and
a processor coupled with the transceiver and configured to:

receive, from a base station, a first data including a plurality of code blocks, the plurality of code blocks being included in one or more code block groups, transmit, to the base station, a negative acknowledgement (NACK) corresponding to the first data, receive, from the base station, downlink control information (DCI) associated with a second data which is a retransmission of the first data, the DCI including an indicator associated with a hybrid automatic repeat request (HARQ) combining at the terminal, and receive, from the base station, the second data based on the DCI, perform the HARQ combining of at least one code block group in the second data with at least one same code block group of the first data, in case that the indicator indicates an HARQ combining, and perform a flushing of at least one code block group of the first data and decode the second data in a case that the indicator indicates an HARQ flushing.

14. The terminal of claim 13, wherein in case that the indicator is M bits and a number of the plurality of code blocks is N, each M-1 bits of the indicator indicates whether ⌈N/M⌉ code blocks are combined and a last M-th bit indicates whether N-(M-1) ⌈N/M⌉ code blocks are combined.

15. The terminal of claim 13, wherein the at least one code block group determined not to be combined at the terminal includes code blocks mapped to resources in which receptions of a first type data and a second type data overlapped with each other.

16. The terminal of claim 15, wherein the first type data is data for an enhanced mobile broadband (eMBB) service or a massive machine type communications (mMTC) service and the second type data is data for an ultra-reliable and low-latency communications (URLLC) service.

* * * * *